United States Patent
Higuchi et al.

(10) Patent No.: US 11,513,410 B2
(45) Date of Patent: Nov. 29, 2022

(54) ELECTROCHROMIC DEVICE USING ORGANIC/METAL HYBRID POLYMER AND METHOD FOR PRODUCING SAME

(71) Applicant: NATIONAL INSTITUTE FOR MATERIALS SCIENCE, Tsukuba (JP)

(72) Inventors: Masayoshi Higuchi, Tsukuba (JP); Yuki Seino, Tsukuba (JP)

(73) Assignee: National Institute for Materials Science, Tsukuba (JP)

(*) Notice: Subject to any disclaimer, the term of this patent is extended or adjusted under 35 U.S.C. 154(b) by 313 days.

(21) Appl. No.: 16/612,030

(22) PCT Filed: Apr. 20, 2018

(86) PCT No.: PCT/JP2018/016329
§ 371 (c)(1),
(2) Date: Nov. 8, 2019

(87) PCT Pub. No.: WO2018/207591
PCT Pub. Date: Nov. 15, 2018

(65) Prior Publication Data
US 2021/0141279 A1 May 13, 2021

(30) Foreign Application Priority Data
May 10, 2017 (JP) .............................. JP2017-094305

(51) Int. Cl.
*G02F 1/1516* (2019.01)
*G02F 1/1523* (2019.01)
(Continued)

(52) U.S. Cl.
CPC ........ *G02F 1/15165* (2019.01); *C08L 101/12* (2013.01); *G02F 1/155* (2013.01);
(Continued)

(58) Field of Classification Search
CPC . G02F 1/155; G02F 2001/1555; G02F 1/1514
(Continued)

(56) References Cited

U.S. PATENT DOCUMENTS 4,645,307 A * 2/1987 Miyamoto ............ G02F 1/1523
359/270
5,708,523 A * 1/1998 Kubo ...................... G02F 1/155
359/269
(Continued)

FOREIGN PATENT DOCUMENTS

CN 104183303 A 12/2014
DE 102015104439 A1 9/2016
(Continued)

OTHER PUBLICATIONS

International Preliminary Report on Patentability, with English translation, for Application No. PCT/JP2018/016329, dated Nov. 21, 2019, 12 pages.
(Continued)

*Primary Examiner* — Zachary W Wilkes
(74) *Attorney, Agent, or Firm* — Crowell & Moring LLP

(57) ABSTRACT

The present invention is an electrochromic device which is provided with a first electrode; an electrochromic layer which is disposed on the first electrode, while containing an organic/metal hybrid polymer that contains at least an organic ligand and a metal ion to which the organic ligand is coordinated; an electrolyte layer which is disposed on the electrochromic layer; a counter electrode material layer which is disposed on the electrolyte layer and contains a conductive polymer; and a second electrode which is disposed on the counter electrode material layer. The conductive polymer may be at least one polymer that is selected from the group consisting of polypyrroles, polyanilines, polythiophenes, poly(p-phenylene)s, poly(3,4-ethylenedioxythiophene)-poly(styrene sulfonate)s (PEDOT:PSS),
(Continued)

polyfluorenes, poly(p-phenylenevinylene)s, polythienylenevinylenes and organic/metal hybrid polymers.

17 Claims, 8 Drawing Sheets

(51) Int. Cl.
    *G02F 1/155* (2006.01)
    *G02F 1/161* (2006.01)
    *C08L 101/12* (2006.01)

(52) U.S. Cl.
    CPC ............ *G02F 1/1525* (2013.01); *G02F 1/161* (2013.01); *G02F 2001/1555* (2013.01); *G02F 2202/022* (2013.01); *G02F 2202/16* (2013.01)

(58) Field of Classification Search
    USPC .................................................. 359/265, 273
    See application file for complete search history.

(56) References Cited

U.S. PATENT DOCUMENTS

| | | | |
|---|---|---|---|
| 9,759,975 B2 * | 9/2017 | Wang .................. H01J 37/3405 |
| 9,977,262 B2 * | 5/2018 | Boulton ................ G02C 7/101 |
| 10,118,995 B2 * | 11/2018 | Higuchi ..................... C08J 5/18 |
| 10,377,943 B2 * | 8/2019 | Higuchi ................ G02F 1/1503 |
| 11,203,688 B2 * | 12/2021 | Higuchi ................ C08G 83/008 |
| 2002/0191270 A1 * | 12/2002 | Lu ........................ G02F 1/15165 359/272 |
| 2005/0248825 A1 * | 11/2005 | Warren ................. G02F 1/1506 359/265 |
| 2014/0146381 A1 * | 5/2014 | Chen ..................... G02F 1/1516 359/265 |
| 2018/0088426 A1 | 3/2018 | Posset et al. |
| 2019/0187532 A1 * | 6/2019 | Milliron ................ G02F 1/1525 |
| 2021/0109416 A1 * | 4/2021 | Higuchi .............. G02F 1/15165 |

FOREIGN PATENT DOCUMENTS

| | | |
|---|---|---|
| JP | S56-4679 A | 1/1981 |
| JP | H03-81738 A | 4/1991 |
| JP | H03-290626 A | 12/1991 |
| JP | 2004-020928 A | 1/2004 |
| JP | 2006-058618 A | 3/2006 |
| JP | 2006-235632 A | 9/2006 |
| JP | 2007-112957 A | 5/2007 |
| JP | 2007112957 A * | 5/2007 ........... C07D 213/53 |
| JP | 2007112957 A | 5/2007 |
| JP | 2007-270146 A | 10/2007 |
| JP | 2012-501008 A | 1/2012 |
| JP | 2012-188517 A | 10/2012 |
| JP | 2014-178493 A | 9/2014 |
| JP | 2016-065180 A | 4/2016 |
| JP | 2017-021077 A | 1/2017 |
| WO | WO 2016/034113 A1 | 3/2016 |

OTHER PUBLICATIONS

Office Action in Chinese Application No. 201880031041.3, dated Oct. 9, 2021, including English translation, 21 pages.
Office Action in Japan Application No. 2019-51742, including English translation, dated Jun. 19, 2020, 6 pages.
Extended European Search Report in Europe Application No. 18798665.8, dated Jan. 14, 2021, 10 pages.
Inoue et al., "Deposited Cr2O3 as a Barrier in a Solid State WO3 Electrochromic Cell", Japan. J. Appl. Phys., vol. 16 (1977) No. 11, 3 pages.
Shimizu et al. "Solid-state electrochromic device consisting of amorphous WO3 and Cr2O3", J. Appl. Phys., vol. 50 (Jun. 1979) No. 6, 7 pages.
Seino et al., "Investigation of thermal stability of electrochromic devices using metallo-supramolecular polymer" Polymer Preprints, Japan vol. 65, No. 2 (2016), 6 pages.
Kanao et al., "Development of electrochromic devices using metallo-supramolecular polymer and various gel electrolyte" Polymer Preprints, Japan vol. 65, No. 1 (2016), 5 pages.
Seino et al., "Development of high repeating durability electrochromic devices using metallo-supramolecular polymer" Polymer Preprints, Japan vol. 66, No. 1 (2017), 6 pages.
Seino et al., "Development of electrochromic devices using metallo-supramolecular polymer realizing high temperature operation", The 67th Conference of Japan Society of Coordination Chemistry, Summary of the 67th Conference of Japan Society of Coordination Chemistry Machine translation, Japan Society of Coordination Chemistry (Sep. 1, 2017) 5 pages.

* cited by examiner

EXAMPLE 1

EXAMPLE 1
(UNDER ROOM TEMPERATURE)

EXAMPLE 2
(UNDER ROOM TEMPERATURE)

FIRST ELECTRODE (ITO)

PolyFe FILM

SECOND ELECTRODE (ITO)

DETERIORATION / DISCOLORING

ELECTROCHROMIC DEVICE USING ORGANIC/METAL HYBRID POLYMER AND METHOD FOR PRODUCING SAME

This application is a 371 application of PCT/JP2018/016329 having an international filing date of Apr. 20, 2018, which claims priority to JP2017-094305 filed May 10, 2017, the entire content of each of which is incorporated herein by reference.

TECHNICAL FIELD

The present invention relates to an electrochromic device using an organic/metallic hybrid polymer and a method of producing the same.

BACKGROUND ART

In recent years, electrochromic materials have attracted attention as display materials and light control materials. A variety of highly responsive electrochromic devices have been developed which use organic/metallic hybrid polymers having the advantages of conventional organic and inorganic electrochromic materials as electrochromic materials. (for example, see Patent Literatures 1 and 2). Patent Literatures 1 and 2 disclose an organic/metallic hybrid polymer where an organic ligand is a terpyridine group or a phenanthroline group, to which a metal ion is coordinated, and an electrochromic device thereof. It is desirable for these electrochromic devices to be able to withstand use at high temperatures. However, it has been considered that it is hard to obtain stable electrochromic behavior at high temperatures. This is because that energization of the electrochromic device under high temperatures brings about excessive carrier injection due to the improvement of carrier mobility and the change of morphology of a gel electrolyte layer due to the influence of heat, and thus there is a concern of deterioration of the device, especially accelerated deterioration of an ITO substrate surface on a counter electrode. In addition, when water is mixed into the device from the outside air, an electrochemical reaction also occurs at an interface between the counter electrode and the electrolyte layer, which increases the possibility of generation of hydrogen gas or oxygen gas. This gas generation leads to destruction of a film or reduction of an ITO film, which is a major obstacle to the durability of the device.

In Non-Patent Literatures 1 and 2, an electrochromic device, in which a device structure includes an electrode/reduction coloring layer/oxidative coloring layer/electrode, and even if repeated coloring and decoloring, both electrode surfaces are covered with a film, and thus there is no gas generation at all, has been reported. As a disadvantage of this device, the fact that there is no memory performance because reaction products after coloring are in direct contact with each other can be exemplified. Patent Literature 3 discloses a device design guideline in which an ion conductive insulating film is provided between a reduction coloring layer and an oxidation coloring layer in order to ensure memory performance.

Patent Literature 4 discloses an electrochromic device including transparent electrode/iron-iron complex layer/transparent electrolyte layer/nickel-iron complex layer/transparent electrode layer. Patent Literature 5 discloses an electrochromic device including first electrode/electrochromic layer/first electrolyte layer/deterioration preventing layer/second electrode/second electrolyte layer/inorganic protective layer/organic protective layer. In any case, a layer formed of an inorganic material is provided on the electrode side facing the electrochromic layer.

Patent Literatures 6 and 7 disclose the improvement of memory performance of the electrochromic device by using an ionic liquid as an electrolyte layer in order to improve the properties of the electrochromic device.

Non-Patent Literature 3 discloses an electrochromic device using an electrolyte layer containing a non-volatile and flame-retardant ionic liquid, in which by a heat treatment, an organic/metallic hybrid polymer (polyFe) in an electrochromic layer (polyFe) and an ionic liquid (1-butyl-1-methylpyrrolidinium bis(trifluoromethylsulfonyl) imide) form an ionic bond to be a complex, and a solvent in the device is removed, and thereby the electrochromic device is excellent in a response speed, a contrast, and durability. However, it is desirable to obtain additional long-term durability of the device.

The evaluation for the properties of the above-described electrochromic devices is limited to room temperature. Development of a device that is used to evaluate cycle properties under high temperature environment and exhibits a stable electrochromic action has been regarded as an important issue.

CITATION LIST

Patent Literature

Patent Literature 1: Jp-A-2007-112957
Patent Literature 2: Jp-A-2012-188517
Patent Literature 3: Jp-A-S56-4679
Patent Literature 4: Jp-A-2016-065180
Patent Literature 5: Jp-A-2017-021077
Patent Literature 6: Jp-A-2012-501008
Patent Literature 7: Jp-A-2014-178493

Non-Patent Literature

Non-Patent Literature 1: E. Inoue, K. Kawaziri, A. Izawa, Japan. J. Appl. Phys., 16 (1977) 2065
Non-Patent Literature 2: I. Shimizu, M. Shizukuishi, E. Inoue, J. Appl. Phys., 50 (1979) 4027
Non-Patent Literature 3: Yuki Seino et al., Polymer Preprints, Japan Vol. 65, No. 2 (2016)

SUMMARY OF INVENTION

Technical Problem

The present invention has been made in view of the above problems, and an object of the present invention is to provide a novel electrochromic device having stable cycle properties in a high temperature environment and a method of producing the same.

Solution to Problem

Aspects of the present invention for achieving the above object are as follows.

[1].
An electrochromic device comprising a first electrode; an electrochromic layer which is disposed on the first electrode and contains an organic/metallic hybrid polymer containing at least an organic ligand and a metal ion coordinated to the organic ligand; an electrolyte layer disposed on the electrochromic layer; a counter electrode material layer which is disposed on the electrolyte layer and contains a conductive polymer; and a second electrode disposed on the counter electrode material layer.

[2].

The electrochromic device according to the above [1], wherein the conductive polymer is at least one polymer selected from the group consisting of polypyrroles, polyanilines, polythiophenes, poly(p-phenylene)s, poly(3,4-ethylenedioxythiophene)-poly(styrene sulfonate)s (PEDOT: PSS), polyfluorenes, poly(p-phenylenevinylene)s, polythienylenevinylenes and organic/metallic hybrid polymers.

[3].

The electrochromic device according to the above [1], wherein the counter electrode material layer containing the conductive polymer has a thickness in a range of 10 nm or more and 50 nm or less.

[4].

The electrochromic device according to the above [1], wherein a ratio of a layer thickness of the counter electrode material layer to a layer thickness of the second electrode satisfies a range of 0.03 or more and 0.71 or less.

[5].

The electrochromic device according to the above [4], wherein the ratio of the layer thickness of the counter electrode material layer to the layer thickness of the second electrode satisfies a range of 0.20 or more and 0.42 or less.

[6].

The electrochromic device according to the above [1], wherein the organic ligand is at least one selected from the group consisting of a terpyridine group, a phenanthroline group, a bipyridine group, an imino group, and derivatives thereof.

[7].

The electrochromic device according to the above [1], wherein the metal ion is at least one selected from the group consisting of Pt, Cu, Ni, Pd, Ag, Mo, Fe, Co, Ru, Rh, Eu, Zn, and Mn.

[8].

The electrochromic device according to the above [1], wherein the organic/metallic hybrid polymer is at least one represented by a general formula selected from the group consisting of Formulae (I), (II) and (III):

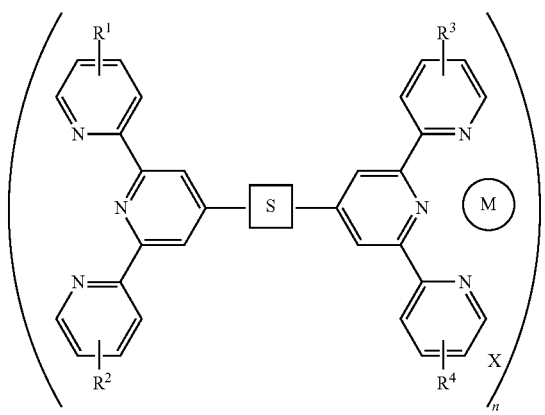

(I)

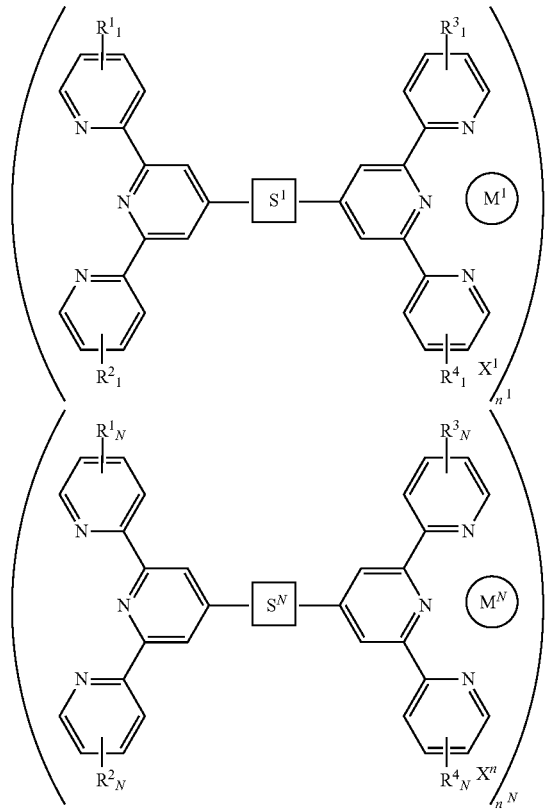

(II)

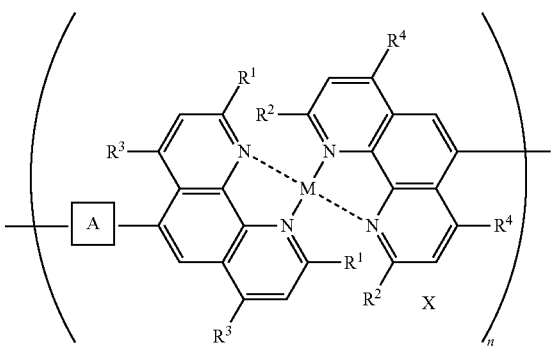

(III)

wherein in the Formula (I), M represents a metal ion, X represents a counter anion, S represents a spacer containing a carbon atom and a hydrogen atom or a spacer directly connecting two terpyridine groups, $R^1$ to $R^4$ each independently represent a hydrogen atom or a substituent, and n is an integer of 2 or more indicating the degree of polymerization, wherein in the Formula (II), $M^1$ to $M^N$ (N is an integer of 2 or more) each independently represent a metal ion having different oxidation-reduction potentials, and $X^1$ to $X^n$ (n is an integer of 2 or more) each independently represent a counter anion, $S^1$ to $S^N$ (N is an integer of 2 or more) each independently represent a spacer containing a carbon atom and a hydrogen atom or a spacer directly connecting two terpyridine groups, $R^1_1$ to $R^1_N$, $R^2_1$ to $R^2_N$, $R^3_1$ to $R^3_N$, and $R^4_1$ to $N^4_N$ (N is an integer of 2 or more) each independently represent a hydrogen atom or a substituent, and $n^1$ to $n^N$ are each independently an integer of 2 or more indicating the degree of polymerization, and wherein in the Formula (III), M represents a metal ion, X represents a counter anion, A represents a spacer containing a carbon atom and a hydrogen atom or a spacer directly connecting two phenanthroline groups, $R^1$ to $R^4$ each independently represent a hydrogen atom or a substituent, and n is an integer of 2 or more indicating the degree of polymerization.

[9].

The electrochromic device according to the above [1], wherein the electrolyte layer contains at least a polymer and a support salt.

[10].

The electrochromic device according to the above [9], wherein the polymer is at least one selected from the group consisting of polymethyl methacrylate (PMMA), polyethylene oxide (PEO), poly (vinylidene fluoride-co-hexafluoroisopropyl) (PVdF-co-PHFP), polypropylene carbonate (PPC), polycarbonate, and polyacrylonitrile.

[11].

The electrochromic device according to the above [9], wherein the support salt is at least one selected from the group consisting of $LiClO_4$, $LiBF_4$, $LiAsF_6$, $LiPF_6$, $LiCF_3SO_3$, $LiCF_3COO$, lithium bis(trifluoromethanesulfonyl) imide (LiTFSI), $LiCH_3COO$, tetrabutylammonium perchlorate, tetraethylammonium perchlorate, KCl, $NaClO_3$, NaCl, $NaBF_4$, NaSCN, $KBF_4$, $Mg(ClO_4)_2$, and $Mg(BF_4)_2$.

[12].

The electrochromic device according to the above [9], wherein the electrolyte layer further contains at least one plasticizer selected from the group consisting of propylene carbonate (PC), ethylene carbonate, dimethyl carbonate, diethyl carbonate, γ-butyrolactone, succinonitrile, and an ionic liquid.

[13].

The electrochromic device according to the above [1], wherein the electrochromic layer further contains an ionic liquid, and wherein the ionic liquid forms an ionic bond with the organic/metallic hybrid polymer.

[14].

The electrochromic device according to the above [12] or [13], wherein the ionic liquid is a combination of at least one anion selected from the group consisting of tetrafluoroborate, hexafluorophosphate, bis(trifluoromethanesulfonyl) imide, and bis(pentafluoroethylsulfonyl) imide, with at least one cation selected from the group consisting of imidazolium, pyrrolidinium, and tetraalkylammonium.

[15].

The electrochromic device according to the above [1], which is sealed by a sealing agent containing an epoxy resin and/or a silicone resin.

[16].

A method of producing the electrochromic device according to the above [1], the method including a step of forming an electrochromic layer by applying a material containing an organic/metallic hybrid polymer containing at least an organic ligand and a metal ion coordinated to the organic ligand onto a first electrode; a step of treating a surface of the electrochromic layer with an electrolyte material; a step of forming an electrolyte layer by applying a further electrolyte material on the electrochromic layer; a step of forming a counter electrode material layer by applying a conductive polymer onto a second electrode; a step of forming a structure including the first electrode, the electrochromic layer, the electrolyte layer, the counter electrode material layer, and the second electrode by applying the second electrode having the counter electrode material layer onto the electrolyte layer; and a step of heat-treating the structure.

[17].

The method according to the above [16], wherein the step of treating with the electrolyte material further includes applying the electrolyte material to the surface of the electrochromic layer; and peeling the electrolyte material.

[18].

The method according to the above [17], wherein the applying of the electrolyte material to the surface of the electrochromic layer and the peeling of the electrolyte material are repeated.

[19].

The method according to the above [16], wherein the electrolyte material contains a dehydrated solvent.

[20].

The method according to the above [19], wherein the dehydrated solvent is at least one selected from the group consisting of acetonitrile, acetone, and tetrahydrofuran.

Advantageous Effects of Invention

The electrochromic device according to the present invention uses a conductive polymer as a counter electrode material to cover an electrode surface of a counter electrode, thereby making it possible to suppress the electrode surface deterioration due to repeated energization even in a high temperature environment. As a result, stable cycle characteristics can be achieved even in a high temperature environment.

The method of producing the electrochromic device according to the present invention is advantageous from a viewpoints that the surface of the electrochromic layer is treated with the electrolyte material and the above-described conductive polymer is only applied as the counter electrode material layer, and thus there is no need for particular equipment. In particular, by the surface treatment of the electrochromic layer, low molecular weight polymers can be removed to prevent elution of the polymer to the electrolyte layer, so that it is possible to provide an electrochromic device in which a decrease in contrast is suppressed.

Moreover, the production method can remove a solvent of the whole structure by heating, and thus it is possible to provide an electrochromic device with improved response speed, contrast, and repeated driving stability (durability). Preferably, crystallization of the polymer matrix constituting the electrolyte layer is suppressed by using a dehydrated solvent when forming the electrolyte layer, and thus it is possible to provide an electrochromic device in which a decrease in response speed is suppressed. In addition, it is possible to provide an electrochromic device having high heat resistance by containing a non-volatile and flame-retardant ionic liquid.

DESCRIPTION OF EMBODIMENTS

Hereinafter, with reference to the drawings, typical embodiments of an electrochromic device according to the present invention will be described. The present invention is not limited to these embodiments. In addition, the same reference sign may be attached to the same component and duplication description may be omitted.

A configuration and a method of producing the electrochromic device of the present invention will be described in detail.

Figure 1:
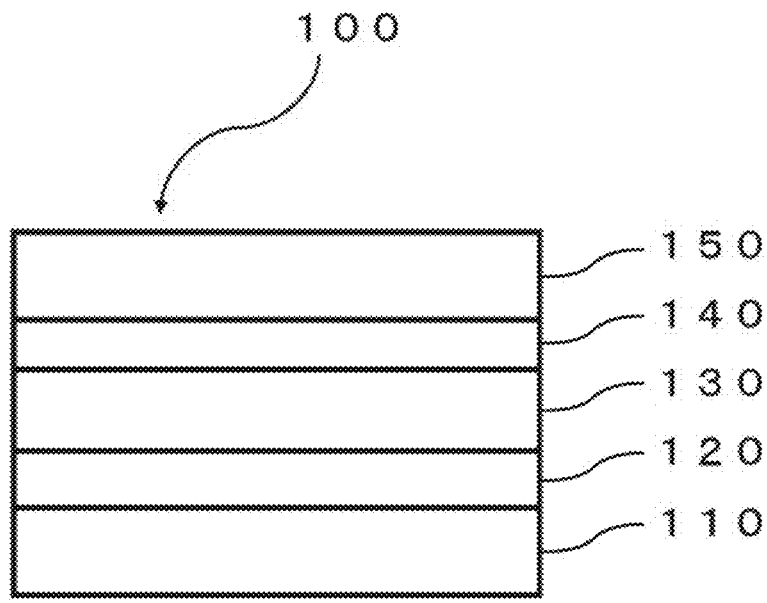
FIG. 1 is a schematic view illustrating a typical example of an electrochromic device of the present invention.

FIG. 1 is a schematic view illustrating a typical example of an electrochromic device of the present invention.

An electrochromic device 100 includes a first electrode 110, an electrochromic layer 120 positioned on the first electrode 110, an electrolyte layer 130 positioned on the electrochromic layer 120, and a counter electrode material layer 140 containing a conductive polymer positioned on the electrolyte layer 130, and a second electrode 150 positioned on the counter electrode material layer 140. The electrochromic layer 120 contains an organic/metallic hybrid polymer containing at least an organic ligand and a metal ion coordinated to the organic ligand. In the electrochromic device having such a configuration, by using a conductive polymer as a counter electrode material to cover an electrode surface of a counter electrode, thereby making it possible to suppress the electrode surface deterioration due to repeated energization even in a high temperature environment, and to achieve stable cycle properties even in a high temperature environment.

The first electrode 110 and the second electrode 150 are not particularly limited, and any known electrode can be used. Preferably, at least one of the first electrode 110 and the second electrode 150 is a transparent electrode that may be of any type. As a material of the transparent electrode, an $SnO_2$ film, an $In_2O_3$ film, or an ITO film which is a mixture of $In_2O_3$ and $SnO_2$ is preferable. Further, the first electrode 110 and the second electrode 150 can be obtained by forming the above transparent electrode materials on a resin substrate such as a plastic material, a transparent substrate such as a glass substrate by using any of a physical vapor deposition method or a chemical vapor deposition method.

The electrochromic layer 120 contains at least an organic/metallic hybrid polymer containing an organic ligand and a metal ion. Here, the organic ligand is not particularly limited as long as it is an organic compound which can coordinate the metal ion and can be polymerized by a polymerization reaction. The organic ligand is preferably selected from the group consisting of a terpyridine group, a phenanthroline group, a bipyridine group, an imino group, and derivatives thereof. The organic ligand constituting the organic/metallic hybrid polymer may be made from a single type or a plurality of types. These organic ligands coordinate with and complex with a metal ion, by which the organic ligand and the metal ion are alternately connected to constitute an organic/metallic hybrid polymer.

The terpyridine group is typically 2,2':6',2"-terpyridine, and may be a derivative having various substituents thereof. Exemplary substituents include a halogen atom, a hydrocarbon group, a hydroxyl group, an alkoxy group (for example, $C_1$ to $C_{10}$), a carbonyl group, a carboxylic acid ester group (for example, $C_1$ to $C_{10}$), an amino group, a substituted amino group, an amido group, a substituted amido group, a cyano group, and a nitro group. As the hydrocarbon group, for example, a linear or branched alkyl group having $C_1$ to $C_{10}$ or the like, specifically, a methyl group, an ethyl group, an n-propyl group, an i-propyl group, an n-butyl group, and a t-butyl group can be exemplified. Further, examples of the substituent which these substituents may have include substituents such as an alkyl group having $C_1$ to $C_{10}$ such as a methyl group, an ethyl group, and a hexyl group, an alkoxy group having $C_1$ to $C_{10}$ such as a methoxy group and a butoxy group, and a halogen atom such as chlorine and bromine, but are not limited thereto.

Examples of the bipyridine group include 2,2'-bipyridine, 3,3'-bipyridine, 4,4'-bipyridine, 2,3'-bipyridine, 2,4'-bipyridine, and 3,4'-bipyridine, or derivatives having various substituents thereof may be used. Here, exemplary substituents are as described above.

The imino group has C=N and may be a derivative having various substituents thereof. Exemplary substituents which the derivative may have are as described above.

The phenanthroline group is obtained by substituting any two carbon atoms of phenanthrene with nitrogen atoms, and may be a derivative having various substituents thereof. Exemplary substituents which the derivative may have include a methyl group, a t-butyl group, a phenyl group, a thienyl group, a bithienyl group, a terthienyl group, and a phenylacetyl group, but are not limited thereto.

The metal ion may be any metal ion that changes valence thereof by an oxidation-reduction reaction, and preferably at least one metal ion selected from the group consisting of Pt, Cu, Ni, Pd, Ag, Mo, Fe, Co, Ru, Rh, Eu, Zn, and Mn. These metal ions coordinate with the above-described organic ligands. More preferably, when the organic ligand is a terpyridine group or a derivative thereof, a hexacoordinated metal ion is selected, and in a case where the organic ligand is a phenanthroline group, a bipyridine group, an imino group, or a derivative thereof, a tetracoordinated metal ion is selected.

The organic/metallic hybrid polymer is preferably represented by a general formula selected from the group consisting of Formulae (I), (II), and (III). In one embodiment, the organic/metallic hybrid polymer may be a mixture thereof.

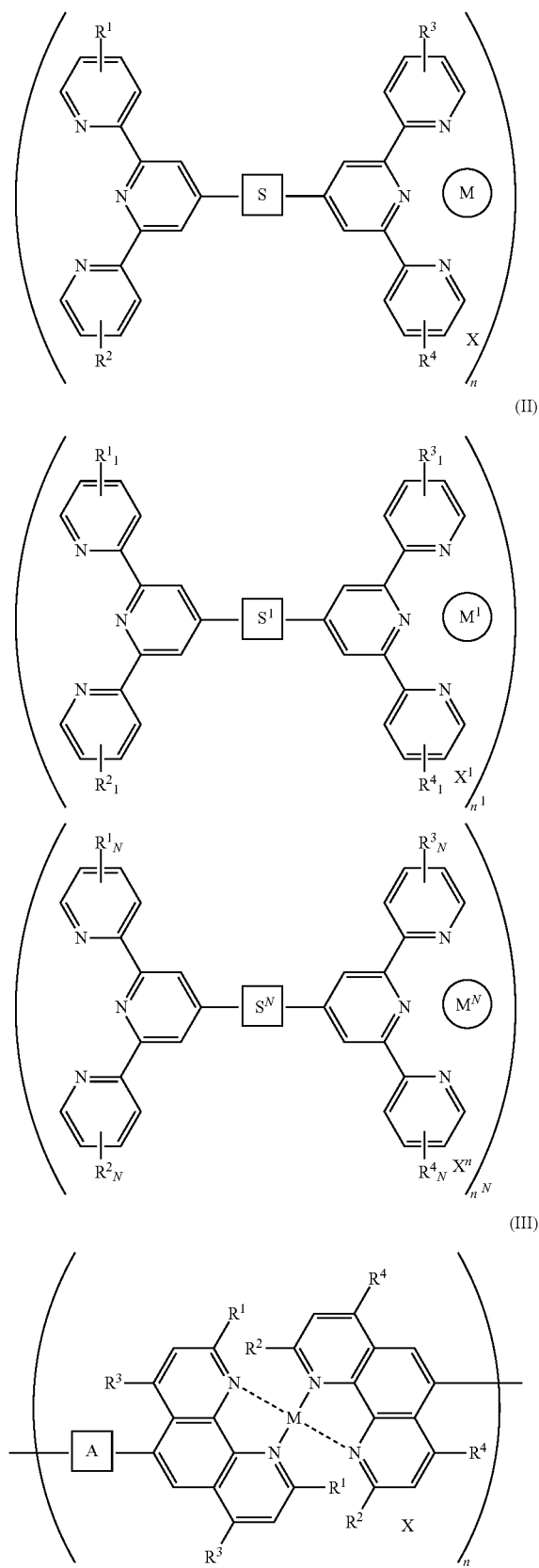

Each of the organic/metallic hybrid polymers represented by Formulae (I) and (II) contains as an organic ligand a terpyridine group or a derivative thereof and a metal ion coordinated therewith. The organic/metallic hybrid polymer represented by Formula (III) contains as an organic ligand a phenanthroline or a derivative thereof and a metal ion coordinated therewith.

In Formula (I), M represents a metal ion, X represents a counter anion, S represents a spacer containing a carbon atom and a hydrogen atom or a spacer directly connecting two terpyridine groups, $R^1$ to $R^4$ each independently represent a hydrogen atom or a substituent, and n is an integer of 2 or more indicating the degree of polymerization.

In Formula (I), $M^1$ to $M^N$ (N is an integer of 2 or more) each independently represent a metal ion having different oxidation-reduction potentials, and $X^1$ to $X^n$ (n is an integer of 2 or more) each independently represent a counter anion, $S^1$ to $S^N$ (N is an integer of 2 or more) each independently represent a spacer containing a carbon atom and a hydrogen atom or a spacer directly connecting two terpyridine groups, $R^1_1$ to $R^1_N$, $R^2_1$ to $R^2_N$, $R^3_1$ to $R^3_N$, and $R^4_1$ to $R^4_N$ (N is an integer of 2 or more) each independently represent a hydrogen atom or a substituent, and $n^1$ to $n^N$ are each independently an integer of 2 or more indicating the degree of polymerization.

Here, the metal ions in Formula (I) and Formula (II) may be preferably at least one metal ion selected from the group consisting of Fe, Co, Ni, Zn, and Rh. Since these metal ions can take a 6-coordinated form, complex formation with the organic ligand is possible.

The counter anion in Formula (I) and Formula (II) may be selected from the group consisting of an acetate ion, a phosphate ion, a chloride ion, a phosphorus hexafluoride ion, a boron tetrafluoride ion, and polyoxometalate. These counter anions make the organic/metallic hybrid polymer electrically neutral and stabilize.

In a case where the spacer in Formula (I) and Formula (II) is a spacer containing a carbon atom and a hydrogen atom, such a spacer may be a divalent organic group containing a carbon atom and a hydrogen atom. Examples thereof include an aliphatic hydrocarbon group, an alicyclic hydrocarbon group, an aromatic hydrocarbon group, and a heterocyclic group. Among them, an arylene group such as a phenylene group and a biphenylene group is preferable. Further, these hydrocarbon groups may have a substituent such as an alkyl group such as a methyl group, an ethyl group, and a hexyl group, an alkoxy group such as a methoxy group and a butoxy group, and a halogen atom such as chlorine and bromine. Moreover, such a spacer may further contain an oxygen atom or a sulfur atom. The oxygen atom and the sulfur atom have modifying ability, and thus are advantageous for material design of the organic/metallic hybrid polymer.

Among divalent arylene groups, arylene groups indicated below are preferable. With these groups, the organic/metallic hybrid polymer is stabilized.

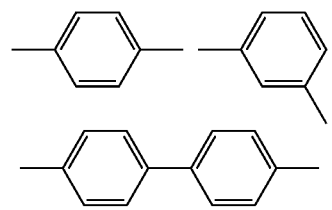

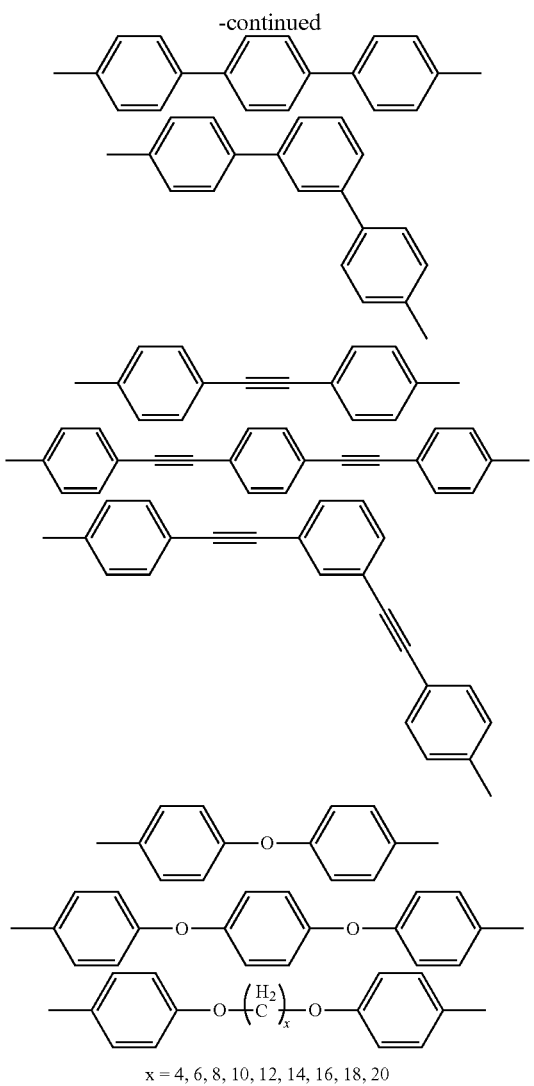

x = 4, 6, 8, 10, 12, 14, 16, 18, 20

As the aliphatic hydrocarbon group constituting the spacer, for example, an alkylene group having $C_1$ to $C_6$ or the like, specifically, a methylene group, an ethylene group, an n-propylene group, an i-propylene group, an n-butylene group, and a t-butylene group can be exemplified.

Further, as divalent organic groups constituting the spacer, these groups added with a substituent such as an alkyl group having $C_1$ to $C_6$ such as a methyl group, an ethyl group, and a hexyl group, an alkoxy group having $C_1$ to $C_6$ such as a methoxy group and a butoxy group, and a halogen atom such as chlorine and bromine may be used.

$R^1$ to $R^4$ of Formula (I) and $R^1_1$ to $R^1_N$, $R^2_1$ to $R^2_N$, $R^3_1$ to $R^3_N$, and $R^4_1$ to $R^4_N$ of Formula (II) each independently represent a hydrogen atom or a substituent, and examples of the substituent include a halogen atom, a hydrocarbon group, a hydroxyl group, an alkoxy group (for example, $C_1$ to $C_{10}$), a carbonyl group, a carboxylic acid ester group (for example, $C_1$ to $C_{10}$), an amino group, a substituted amino group, an amido group, a substituted amido group, a cyano group, and a nitro group. As the hydrocarbon group, for example, a linear or branched alkyl group having $C_1$ to $C_{10}$ or the like, specifically, a methyl group, an ethyl group, an n-propyl group, an i-propyl group, an n-butyl group, and a t-butyl group can be exemplified. Further, as examples of the substituent which these substituents may have, these hydrocarbon groups added with a substituent such as an alkyl group having $C_1$ to $C_{10}$ such as a methyl group, an ethyl group, and a hexyl group, an alkoxy group having $C_1$ to $C_{10}$ such as a methoxy group and a butoxy group, and a halogen atom such as chlorine and bromine may be used, but the substituent is not limited to these examples.

In Formula (I), n is an integer of 2 or more indicating the degree of polymerization, and is, for example, 2 to 5,000, and preferably 10 to 1,000. In Formula (II), $n^1$ to $n^N$ each independently represent an integer of 2 or more indicating the degree of polymerization, and the sum $n^1 + n^2 \ldots + n^N$ is, for example, 2 to 5,000, and preferably 10 to 1,000.

In Formula (III), M represents a metal ion, X represents a counter anion, A represents a spacer containing a carbon atom and a hydrogen atom or a spacer directly connecting two phenanthroline groups, $R^1$ to $R^4$ each independently represent a hydrogen atom or a substituent, and n is an integer of 2 or more indicating the degree of polymerization.

Here, the metal ion in Formula (III) may be at least one metal ion selected from the group consisting of Pt, Cu, Ni, Ag, and Pd. Since these metal ions can take a 4-coordinated form, complex formation with the organic ligand is possible. The counter anion in Formula (II) may be selected from the group consisting of a perchlorate ion, a triflate ion, a boron tetrafluoride ion, a chloride ion, and a hexafluorophosphate ion. These counter anions make the organic/metallic hybrid polymer electrically neutral and stabilize.

In a case where the spacer in Formula (III) is a spacer containing a carbon atom and a hydrogen atom, typical examples of the spacer include a phenyl group, a biphenyl group, a terphenyl group, a thienyl group, a bithienyl group, or a terthienyl group as illustrated below. Further, in order to enhance the solubility of a bis(phenanthroline) derivative, it is also desirable to use a spacer modified with an alkyl group (having 1 to 16 carbon atoms) or an alkoxy group (having 1 to 16 carbons). Furthermore, a spacer in which phenyl groups are connected by a dioxoalkyl group (having 2 to 16 carbon atoms) can also be used.

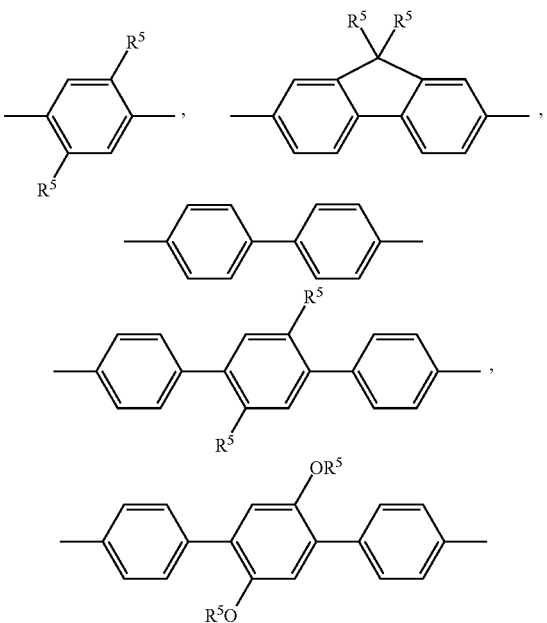

$R^5$ = H, $C_mH_{2m+1}$ (m = 1-16)

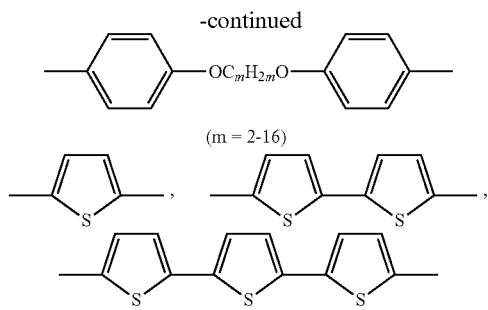

(m = 2-16)

As illustrated below, examples of $R^1$ and $R^2$ in Formula (III) include hydrogen, a methyl group, a t-butyl group, a phenyl group, a thienyl group, a bithienyl group, and a terthienyl group. Examples of $R^3$ and $R^4$ in Formula (III) include hydrogen, a phenyl group, and a phenylacetyl group.

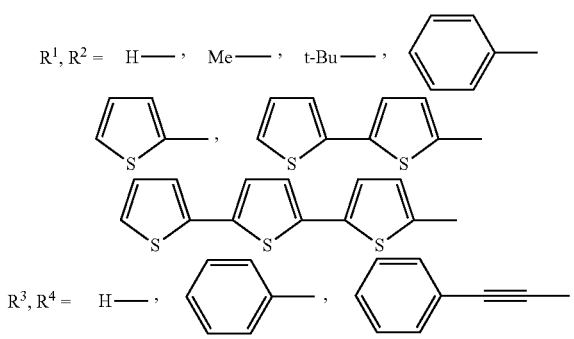

In Formula (III), n is an integer of 2 or more indicating the degree of polymerization, and is, for example, 2 to 5,000, and preferably 10 to 1,000.

The organic/metallic hybrid polymer exhibits a color based on charge transfer absorption from the metal ion to the organic ligand. That is, the organic/metallic hybrid polymer is in a decolored state in which the coloring is lost when it is electrochemically oxidized, and in a colored state when it is electrochemically reduced. This phenomenon can occur repeatedly. Thus, such an organic/metallic hybrid polymer functions as an electrochromic material.

The electrochromic layer 120 may further contain an ionic liquid. Here, the ionic liquid can form an ionic bond with the above-described organic/metallic hybrid polymer to form a complex. By forming a complex, it is possible to maintain the counter anion from the adjacent electrolyte layer 130 in the complex, so that quick response properties can be achieved.

As such an ionic liquid, any ionic liquid in which the organic/metallic hybrid polymer forms an ionic bond can be employed. Specific examples thereof include a combination of at least one anion selected from the group consisting of tetrafluoroborate, hexafluorophosphate, bis(trifluoromethanesulfonyl) imide, and bis(pentafluoroethylsulfonyl) imide, with at least one cation selected from the group consisting of imidazolium, pyrrolidinium, and tetraalkylammonium, but the ionic liquid is not limited to these examples.

More preferably, the ionic liquid has a melting point below room temperature. With this, it is possible to promote gelation of the polymer in the production of the electrochromic device. More preferably, the ionic liquid has a melting point of 0° C. or lower. With this, the ionic liquid reliably becomes a liquid at room temperature, which is advantageous in the production of the electrochromic devices. In the present specification, the term "room temperature" is intended to mean a temperature range of 0° C. to 50° C.

More preferably, the ionic liquid has a potential window in a range from a negative potential of at least −1 V vs Ag/Ag+ or lower to a positive potential of +2 V vs Ag/Ag+ or more. Still more preferably, the ionic liquid has a potential window in a range from a negative potential of −3 V vs Ag/Ag+ or lower to a positive potential of +3 V vs Ag/Ag+ or more. As a result, the electrochemical stability of the ionic liquid is further enhanced, and the durability of the electrochromic device can be further enhanced.

For example, 1-butyl-1-methylpyrrolidinium bis(trifluoromethylsulfonyl) imide has a potential window in a range from a negative potential of −3 V vs Ag/Ag+ or lower to a positive potential of +2.4 V vs Ag/Ag+ or more, and has a melting point of −18° C. or lower, which is preferable. In addition, methyltrioctylammonium bis(trifluoromethylsulfonyl) imide, 1-ethyl-1-methylpyrrolidinium allylsulfonate, 1-ethyl-1-methylimidazolium allylsulfonate, and the like have a potential window in a range from a negative potential of −2 V vs Ag/Ag+ or lower to a positive potential of +2.5 V vs Ag/Ag+ or more, and has a melting point of −2° C. or lower, which is usable.

The electrolyte layer 130 has a function of compensating the charge for the change in valence associated with the oxidation-reduction reaction of the metal ion in the organic/metallic hybrid polymer in the electrochromic layer 120. Such an electrolyte layer 130 preferably contains at least a polymer and a support salt. The charge compensation function can be achieved by the polymer and the support salt.

Preferably, the polymer may be at least one selected from the group consisting of polymethyl methacrylate (PMMA), polyethylene oxide (PEO), poly(vinylidene fluoride-co-hexafluoroisopropyl) (PVdF-co-PHFP), polypropylene carbonate (PPC), polycarbonate, and polyacrylonitrile. These polymers are advantageous for the configuration of a gel electrolyte layer.

Preferably, the support salt may be at least one selected from the group consisting of $LiClO_4$, $LiBF_4$, $LiAsF_6$, $LiPF_6$, $LiCF_3SO_3$, $LiCF_3COO$, lithium bis(trifluoromethanesulfonyl) imide (LiTFSI), $LiCH_3COO$, tetrabutylammonium perchlorate, tetraethylammonium perchlorate, KCl, $NaClO_3$, NaCl, $NaBF_4$, NaSCN, $KBF_4$, $Mg(ClO_4)_2$, and $Mg(BF_4)_2$. These support salts effectively function as counter anions of the organic/metallic hybrid polymer.

Preferably, the electrolyte layer 130 contains at least one plasticizer selected from the group consisting of propylene carbonate (PC), ethylene carbonate, dimethyl carbonate, diethyl carbonate, γ-butyrolactone, succinonitrile, and an ionic liquid. Since the same ionic liquid as that described above can be employed for the ionic liquid as the plasticizer, the description thereof is omitted. For example, if the above-described polymer and support salt in addition to such a plasticizer are dissolved in a dehydrated solvent (described later) and cast, and then the solvent is removed, the gel electrolyte layer in which the polymer, plasticizer, and support salt are uniformly dispersed can be formed, which leads to the improvement and stabilization of the properties of the electrochromic device.

The electrolyte layer 130 may further contain at least one ion storage material selected from the group consisting of viologen, N,N,N',N'-tetramethyl-p-phenylenediamine and an organic metal complex. With this, accumulation of charge between the first electrode 110 and the electrochromic layer 120 can be suppressed, so that physical damage to the first electrode 110 caused by the accumulation of charge can be suppressed. Exemplary organic metal complexes are ferrocene, prussian blue, porphyrins, and the like. Although the organic/metallic hybrid polymer contained in the electrochromic layer 120 can also suppress the accumulation of charge, if the above-described ion storage material is further contained, damage to the first electrode 110 and the substrate provided with the same can be further effectively prevented.

The counter electrode material layer 140 contains a conductive polymer. By the introduction of the conductive polymer, formation of hydroxide or the like on the surface of the second electrode 150 can be suppressed, and damage to the second electrode 150 can be suppressed. Preferably, such a conductive polymer may be at least one polymer selected from the group consisting of polypyrroles, polyanilines, polythiophenes, poly(p-phenylene)s, poly(3,4-ethylenedioxythiophene)-poly(styrene sulfonate)s (PEDOT: PSS), polyfluorenes, poly(p-phenylenevinylene)s, polythienylenevinylenes and organic/metallic hybrid polymers.

The organic/metallic hybrid polymer as the conductive polymer may be, for example, at least one selected from the group consisting of compounds represented by Formulae (I), (II), and (III). These organic/metallic hybrid polymers are excellent in the conductivity. The organic/metallic hybrid polymer as the conductive polymer may be the same as the organic/metallic hybrid polymer as the electrochromic layer 120, and a different one is preferable because it is excellent in transparency and contrast. In the case where they are the same, reducing the thickness of the counter electrode material layer 140 (for example, 50 nm or less) may solve the problems of transparency and contrast.

In a case where the organic/metallic hybrid polymer of the electrochromic layer 120 is decolorized upon oxidation and colored upon reduction, unlike that, the organic/metallic hybrid polymer used as the conductive polymer of the counter electrode material layer 140 is preferably colored upon the oxidation and decolored upon the reduction. With this, high contrast can be obtained. More preferably, the organic/metallic hybrid polymer which does not exhibit the electrochromic properties in the visible light region is employed as a conductive polymer. With this, the high contrast can be reliably obtained.

More preferably, the counter electrode material layer 140 has high conductivity (for example, 100 S/cm or more) and/or high transmittance in the visible light region (for example, 80% or more at 400 nm to 780 nm). By providing the counter electrode material layer 140 having conductivity to cover the surface of the second electrode 150, an electric double layer by voltage application is formed at an interface between the electrolyte layer 130 and the counter electrode material layer 140, and thus damage of the second electrode 150 can be effectively prevented. Further, by providing the counter electrode material layer 140 having high transmittance, the high contrast can be maintained.

For example, poly(3,4-ethylenedioxythiophene)-poly (styrene sulfonate) (PEDOT:PSS) which is the conductive polymer used in the examples has a high conductivity more than 200 S/cm, and has a high transmittance of 90% or more in the visible light region of 400 nm to 800 nm. PEDOT:PSS also has high heat resistance of 200° C. or higher, and thus is preferable.

The counter electrode material layer 140 preferably has a thickness in a range of 10 nm or more and 50 nm or less. When the thickness of the counter electrode material layer 140 is in this range, formation of a hydroxide can be suppressed, and the damage to the second electrode 150 can be effectively suppressed.

Preferably, the ratio of a layer thickness of the counter electrode material layer 140 to a layer thickness of the second electrode 150 (i.e., the layer thickness of the counter electrode material layer 140/the layer thickness of the second electrode 150) satisfies a range of 0.03 or more and 0.71 or less. With this, it is possible to provide an electrochromic device having low sheet resistance and high transparency. More preferably, the ratio of the layer thickness of the counter electrode material layer 140 to the layer thickness of the second electrode 150 satisfies a range of 0.20 or more and 0.42 or less. With this, it is possible to provide an electrochromic device having a low sheet resistance of about 10 f/sq and a high transparency of 80% or more.

The electrochromic device of the present invention may be sealed by a sealing agent containing an epoxy resin and/or a silicone resin. With this, the barrier properties against oxygen and water of the electrochromic device can be enhanced.

The electrochromic device of the present invention operates as follows. The first electrode 110 and the second electrode 150 are connected to an external power source, and a predetermined voltage is applied to the electrochromic layer 120 and the electrolyte layer 130. With this, the oxidation-reduction of the electrochromic layer 120 can be controlled. That is, the oxidation-reduction of the metal ion of the organic/metallic hybrid polymer which constitutes the electrochromic layer 120 is controlled, and coloring and decoloring can be developed.

Next, a method of producing the electrochromic device will be described in detail.

Figure 2:
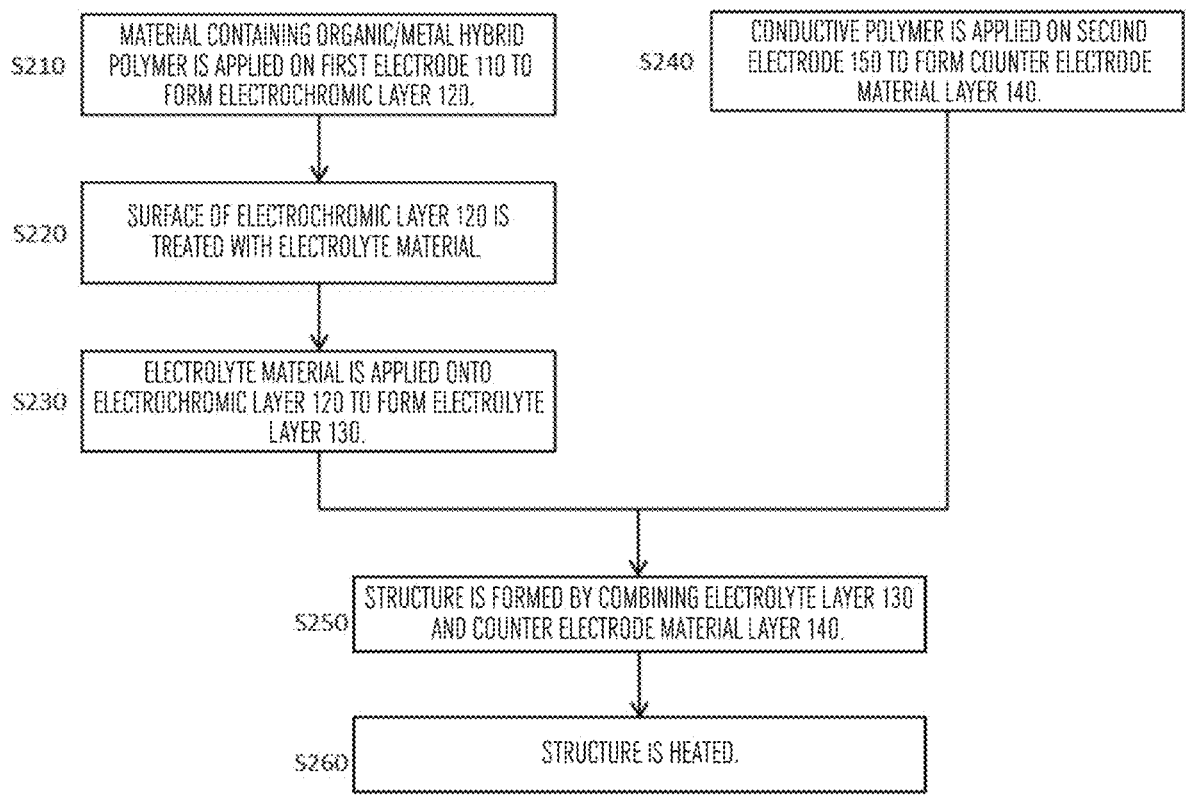
FIG. 2 is a flow chart illustrating a typical example of a producing process of the electrochromic device of the present invention.

FIG. 2 is a flow chart illustrating a typical example of a producing process of the electrochromic device of the present invention.

Step S210: A material containing the organic/metallic hybrid polymer described above is provided on the first electrode 110 (FIG. 1) to form an electrochromic layer 120 (FIG. 1). Means for the provision of the material is not limited as long as the electrochromic layer 120 is formed on the first electrode 110, but in a case where the material is liquid, means such as application, immersion, or spray may be exemplified. The provision of the material is performed, for example, such that the thickness of the electrochromic layer 120 is 10 nm or more and 10 μm or less. Within this range, a sufficient amount of the organic/metallic hybrid polymer is contained in the electrochromic layer 120, so that high electrochromic properties can be exhibited. The above-described organic/metallic hybrid polymer may be dissolved in a solvent such as methanol, ethanol, or 2-propanol.

Step S220: A surface of the electrochromic layer 120 formed in step S210 is treated with an electrolyte material. Specifically, providing (casting) the electrolyte material on the electrochromic layer 120 and peeling off the electrolyte material are further included in this step. By casting and drying the electrolyte material followed by peeling off, the organic/metallic hybrid polymer having a low molecular weight (for example, a weight average molecular weight determined in terms of polystyrene of 1,500 to 10,000 by GPC using an eluent THF) can be eluted and removed in advance into the electrolyte material. As a result, the elution of the organic/metallic hybrid polymer into the electrolyte layer 130 can be suppressed, and thus it is possible to provide an electrochromic device in which a decrease in the contrast is suppressed. This operation is preferably performed twice or more, and more preferably three times or more. With this, the organic/metallic hybrid polymer having a low molecular weight can be reliably eluted and removed.

The electrolyte material used for a surface treatment is preferably one containing a polymer, a support salt, and a plasticizer, but is not limited thereto. In particular, in a case of using the electrolyte material containing an ionic liquid for the electrolyte layer, it is preferable to use an electrolyte material different from the electrolyte layer for the surface treatment. The electrolyte material used for the surface treatment is not particularly limited, and examples thereof include a highly viscous electrolyte material containing PMMA (having a weight average molecular weight determined in terms of polystyrene of 350,000 by GPC using an eluent THF) as the polymer, lithium perchlorate as the support salt, and propylene carbonate as the plasticizer, which are dissolved in a solvent such as acetonitrile. If these materials are used, drying time is made shorter and peeling is facilitated.

Step S230: An additional electrolyte material is provided on the electrochromic layer 120 to form an electrolyte layer 130 (FIG. 1). The electrolyte layer 130 may be formed by providing, on the electrochromic layer 120, the electrolyte material (optionally containing a polymer, a support salt, an ionic liquid, and the like) constituting the above-described electrolyte layer 130. The provision of the material can be performed using any known means such as application, immersion, spray, and electrolytic polymerization. The provision of the material is performed so that the thickness of the electrolyte layer 130 is 10 nm or more and 10 mm or less.

In this provision step, the electrolyte material preferably contains a dehydrated solvent (i.e., a solvent subjected to a dehydration treatment). Thus, the application of the electrolyte material is not only facilitated, but also the crystallization of the above-described polymer (polymer matrix) constituting the electrolyte layer 130 can be suppressed, and a decrease in response speed can be prevented. Preferably, the dehydrated solvent may be at least one solvent selected from the group consisting of acetonitrile, acetone, and tetrahydrofuran.

In a case where the electrolyte layer 130 is an electrolyte layer containing an ionic liquid, it is preferable to provide an electrolyte material satisfying that the weight ratio of the polymer, the support salt, the ionic liquid, and the dehydrated solvent is 4 to 10:1 to 6:10 to 30:50 to 250.

Step S240: The conductive polymer described above is provided on the second electrode 150 (FIG. 1) to form the counter electrode material layer 140 (FIG. 1). Means for the provision is not limited as long as the counter electrode material layer 140 is formed on the second electrode 150, but in a case where the material is liquid, means such as application, spin coating, or spray may be exemplified. The provision is performed, for example, such that the thickness of the counter electrode material layer 140 is 10 nm or more and 50 nm or less. Within this range, high transparency can be obtained in the visible light region. For example, the above-described conductive polymer is provided by being dissolved in a solvent selected from water, methanol, N-methyl-2-pyrrolidone, dimethyl sulfoxide, toluene, xylene, dichloromethane, tetrahydrofuran, and dioxane.

Step S250: A structure configured to include the first electrode 110, the electrochromic layer 120, the electrolyte layer 130, the counter electrode material layer 140, and the second electrode 150 is formed by combining the electrolyte layer 130 formed in step S230 and the second electrode 150 to which the counter electrode material layer 140 formed in step S240 is applied. In the combination step, the layers may be brought into contact with each other and pressed to such an extent that the desired thickness of each layer is maintained.

Step S260: The structure formed in step S250 is heat-treated. With this, an unnecessary solvent (for example, acetonitrile used in the examples) in the structure can be removed, and response speed, contrast, and repeated driving stability (durability) can be improved.

Although the heat treatment is not particularly limited, it is preferable that the heat treatment can be performed by heating the structure formed in step S250 in a temperature range of higher than 50° C. and lower than 150° C. More preferably, the heat treatment temperature may be in a temperature range of 75° C. or more and 120° C. or less. In this temperature range, unnecessary solvents in the entire electrochromic device can be removed.

The heat treatment is not particularly limited, but preferably, it may be performed for 30 minutes or more and 24 hours or less. More preferably, the heat treatment is performed for 30 minutes or more and 5 hours or less. Within this range, the electrochromic device 100 of the present invention can be obtained in a relatively short time, which is advantageous.

It is not necessary to sequentially perform steps S210 to S240, and step S240 may be performed first, and then steps S210 to S230 may be performed.

Next, the present invention will be described in detail using specific working examples; however, the present invention is not limited to these working examples.

EXAMPLES

[Materials]

The materials used in the following examples will be described. All materials are special grade reagents and were used without purification. A glass substrate coated with poly(methyl methacrylate) (PMMA, weight average molecular weight=350 kg/mol) and indium tin oxide (ITO) (hereinafter, referred to as an ITO substrate for simplicity, resistivity=8 to 12 $flcm^2$) was purchased from Sigma-Aldrich Co. LLC.

Methanol (MeOH), acetonitrile (ACN), 1-butyl-1-methylpyrrolidinium bis(trifluoromethylsulfonyl) imide (hereinafter, referred to as BMP-TFSI for the sake of simplicity) were purchased from Wako Pure Chemical Industries, Ltd.

Lithium perchlorate ($LiClO_4$) was purchased from Kanto Chemical Co., Inc.

Poly(3,4-ethylenedioxythiophene)-poly(styrene sulfonate) (PEDOT:PSS) was purchased from Sigma-Aldrich Co. LLC.

A polymeric material represented by Formula (A) was used as an organic/metallic hybrid polymer. The polymer material was prepared by Nard Institute Ltd. with reference to Patent Literature 1 or F. S. Han et al., J. Am. Chem. Soc., 2008, 130 (6), pp 2073-2081. In Formula (A), the organic ligand is a terpyridine group, the metal ion M is an iron (Fe) ion and a ruthenium (Ru) ion, and the counter anion is an acetate ion. Hereinafter, for the sake of simplicity, a polymer material in which M of the Formula is $Fe^{2+}$ is referred to as polyFe, and a polymer material in which M of the formula is $Ru^{2+}$ is referred to as polyRu.

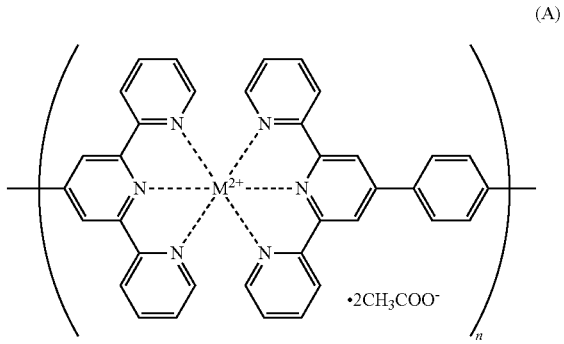

Example 1

In Example 1, an electrochromic device using an ITO substrate as a first electrode 110, polyFe as an electrochromic layer 120, an electrolyte material containing BMP-TFSI, LiClO$_4$, and PMMA as an electrolyte layer 130, PEDOT:PSS as a counter electrode material layer 140, and an ITO substrate as a second electrode 150 was produced.

This device will be described in detail. The electrochromic layer 120 (FIG. 1) was formed by applying polyFe as the organic/metallic hybrid polymer on the ITO substrate as the first electrode 110 (FIG. 1) (step S210 in FIG. 2). A solution containing polyFe was prepared by dissolving polyFe (4 mg) in MeOH (1 mL) and filtering through a syringe filter (polyvinylidene fluoride (PVDF), 0.45 μm) to remove an insoluble residue. The obtained polyFe-containing solution (4 mL) was applied onto an ITO substrate (2.5×2.5 cm) by a spray coating method.

The surface of the electrochromic layer 120 (FIG. 1) was treated with an electrolyte material (step S220 of FIG. 2). As the electrolyte material, a material, in which PMMA and lithium perchlorate were dissolved in propylene carbonate and acetonitrile, was cast on the electrochromic layer 120, and was peeled off after drying. This treatment was performed three times. When viewing the surface of the peeled electrolyte material, an electrolyte material, which was colorless and transparent, was changed to the same color as that of an organic/metallic hybrid polymer film. This reveals that elution and removal of the organic/metallic hybrid polymer having a low molecular weight were successful. Moreover, when the surface of the electrochromic layer after peeling was observed with an optical microscope, it was found that the surface was smooth and uniform.

An additional electrolyte material was applied on the electrochromic layer 120 to form the electrolyte layer 130 (step S230 in FIG. 2). BMP-TFSI as the ionic liquid and LiClO$_4$ as the support salt were dissolved in ACN as the dehydrated solvent, PMMA as the polymer was added, and the mixture was vigorously stirred until the PMMA was completely dissolved so as to obtain an electrolyte material. The electrolyte material thus obtained was a colorless, transparent, semi-gel-like viscous liquid. A weight ratio of PMMA, LiClO$_4$, BMP-TFSI, and ACN was 7:3:20:70. The obtained electrolyte material was added dropwise on the electrochromic layer 120 by a drop casting method so as to form the electrolyte layer 130.

PEDOT:PSS was applied as a counter electrode material on an ITO substrate as the second electrode 150 (FIG. 1) so as to form the counter electrode material layer 140 (Step S240 in FIG. 2). A solution (100 μL) of PEDOT:PSS dispersed in water was applied onto an ITO substrate (2.5× 2.5 cm) by a spin coating method. The spin coating was performed under the conditions of a rotational speed of 1,000 rpm and a rotational time of 30 seconds. After film formation, a baking treatment was performed on a hot plate at 120° C. for 10 minutes. Thus, the smooth and uniform counter electrode material layer 140 was obtained. The thickness of the obtained counter electrode material layer 140 was 30 nm to 50 nm.

A structure configured to include an ITO substrate, a polyFe film, an electrolyte layer, PEDOT:PSS, and an ITO substrate was obtained by combining (Step S250 in FIG. 2) the electrolyte layer 130 and the second electrode 150 on which the counter electrode material layer 140 was applied. The structure was left at room temperature for 24 hours to remove an insoluble solvent. Here, a ratio of the layer thickness of the counter electrode material layer 140 to the layer thickness of the second electrode 150 was in a range of 0.20 to 0.42 (=30 to 50 nm/120 to 150 nm).

The structure was heat-treated (step S260 in FIG. 2). Specifically, the structure was subjected to a heat treatment under conditions of 100° C. for 3 hours, and a relative humidity of 40% to remove an unnecessary solvent. The heat treatment was performed using a vacuum oven (EYELA, VOS-201SD). Thus, two electrochromic devices were produced.

The electrochromic properties of the obtained electrochromic device were evaluated at room temperature. The optical properties and the electrochromic color change of the electrochromic device were measured by UV-vis absorption spectroscopy. DH-2000-BAL UV-vis-NIR light source and USB 4000 detection system of Ocean Optics were used for the measurement. Cyclic voltammetry (CV) and current measurement (AM) of the electrochromic device were performed by an electrochemical analyzer (BAS Inc., ALS/CH Instruments Electrochemical Analyzer model 612B).

For the electrochromic device of Example 1, the electrochromic properties (change in transmittance, decoloring/coloring time, contrast ratio, repeated driving stability, and the like) when the oxidation-reduction was repeated 100 times at room temperature were examined by using the above instruments. Next, the electrochromic device was held in a chamber set at a temperature of 80° C. and a relative humidity of 40%, and the oxidation-reduction was repeated 100 times. Thereafter, the temperature was cooled to room temperature, and the electrochromic properties when the oxidation-reduction was repeated again 1,500 times were examined.

For another electrochromic device of Example 1, the electrochromic properties (change in transmittance, decoloring/coloring time, contrast ratio, repeated driving stability, and the like) when the oxidation-reduction was repeated 1,000 times at room temperature were examined. The above results are shown in FIG. 3 and Table 3. After this measurement and evaluation, the electrochromic device of Example 1 was disassembled, and the electrolyte layer and the counter electrode material layer were wiped off so as to visually observe a state of deterioration of the surfaces of the first electrode 110 and the second electrode 150 on the counter electrode side.

Example 2

In Example 2, an electrochromic device was produced in the same manner as in Example 1 except that the counter electrode material layer 140 was not provided. For the electrochromic device of Example 2, the electrochromic properties (change in transmittance, decoloring/coloring time, contrast ratio, repeated driving stability, and the like) when the oxidation-reduction was repeated 600 times at room temperature were examined. The results are shown in FIG. 3 and Table 3.

Figure 5:
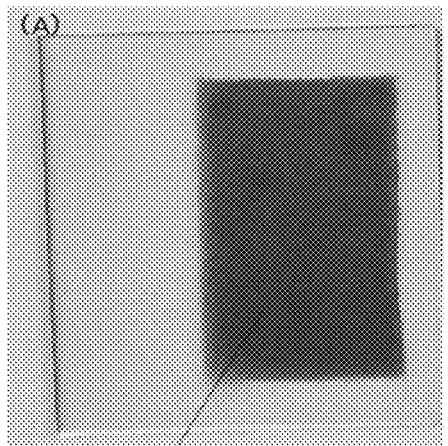
FIG. 5 is a view illustrating appearance of first and second electrode surfaces of the electrochromic device of Example 2 after evaluation for the properties.
Figure 5:
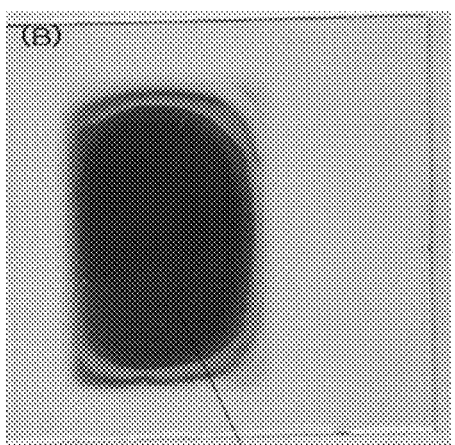

After the evaluation for the properties, the electrochromic device of Example 2 was disassembled, and the electrolyte layer was wiped off so as to visually observe a state of deterioration of the surfaces of the first electrode 110 and the second electrode 150 on the counter electrode side. The results are shown in FIG. 5.

Next, compositions and bonding states of the surfaces of the first electrode 110 and the second electrode 150 were examined. Surface analysis was performed on each of the electrode surfaces using an X-ray photoelectron spectrometer (Quantera SXM manufactured by ULVAC-PHI, Inc.). In addition, the surface analysis was also performed on the ITO substrate to which the polyFe film was applied, and the ITO substrate before applying the polyFe film, as reference samples. The measurement conditions are shown in Table 4.

In addition, the surface analysis was requested to the Material Analysis Station of National Institute for Materials Science. The above results are shown in FIGS. 6 to 11 and Tables 5 and 6.

Example 3

In Example 3, two electrochromic devices provided with a counter electrode material layer were produced in the same manner as in Example 1 except that polyRu was used instead of polyFe. For the electrochromic device of Example 3, the electrochromic properties (change in transmittance, decoloring/coloring time, contrast ratio, repeated driving stability, and the like) when the oxidation-reduction was repeated 100 times at room temperature were examined. Next, the electrochromic device was held in a chamber set at a temperature of 60° C. and a relative humidity of 40%, and the oxidation-reduction was repeated 100 times. Thereafter, the temperature was cooled to room temperature, and the electrochromic properties when the oxidation-reduction was repeated again 800 times were examined. The above results are shown in FIG. 4 and Table 3.

For another electrochromic device of Example 3, the electrochromic properties (change in transmittance, decol-oring/coloring time, contrast ratio, repeated driving stability, and the like) when the oxidation-reduction was repeated 1,200 times at room temperature were examined. The results are shown in FIG. 4 and Table 3.

Example 4

In Example 4, an electrochromic device was produced in the same manner as in Example 3 except that the counter electrode material layer 140 was not provided. For the electrochromic device of Example 4, the electrochromic properties (change in transmittance, decoloring/coloring time, contrast ratio, repeated driving stability, and the like) when the oxidation-reduction was repeated 300 times at room temperature were examined. The results are shown in FIG. 4 and Table 3.

The experimental conditions of the above Examples 1 to 4 are shown in Tables 1 and 2. Table 1 shows the compositions of the structures of Examples 1 to 4. Table 2 shows the repeated measurement conditions of the electrochromic properties of the structures of Examples 1 to 4.

TABLE 1

Table 1: List of structures produced in Examples 1 and 3/Examples 2 and 4

| Example No. | First and second electrodes | Electro-chromic layer | Electrolyte layer | | | | Counter electrode material layer |
|---|---|---|---|---|---|---|---|
| | | | Polymer | Support salt | Plasticizer | Solvent | |
| Example 1 | ITO | PolyFe | PMMA (7) | LiClO$_4$ (3) | BMP-TFSI (20) | ACN (70) | PEDOT:PSS |
| Example 2 | ITO | PolyFe | PMMA (7) | LiClO$_4$ (3) | BMP-TFSI (20) | ACN (70) | — |
| Example 3 | ITO | PolyRu | PMMA (7) | LiClO$_4$ (3) | BMP-TFSI (20) | ACN (70) | PEDOT:PSS |
| Example 4 | ITO | PolyRu | PMMA (7) | LiClO$_4$ (3) | BMP-TFSI (20) | ACN (70) | — |

(The numerical values in parentheses in the table represent weight ratios.)

TABLE 2

Table 2: List of conditions for repetition properties evaluation of structures produced in Examples 1 and 3/Examples 2 and 4

| Example No. | Temperature conditions for properties evaluation | | | Sum of repetition measurements (Number) |
|---|---|---|---|---|
| | Before heating | In chamber | After heating | |
| Example 1 | Room temperature (100) | 80° C. 40% RH (100) | Room temperature (1500) | 1700 |
| | Room temperature (1000) | | | 1000 |
| Example 2 | Room temperature (600) | | | 600 |
| Example 3 | Room temperature (100) | 60° C. 40% RH (100) | Room temperature (800) | 1000 |
| | Room temperature (1200) | | | 1200 |
| Example 4 | Room temperature (300) | | | 300 |

(The numerical values in parentheses in the table represent the number of repetition measurements.)

FIG. 3 is a view illustrating a change in transmittance at a wavelength of 580 nm when the oxidation-reduction is repeated under various conditions of the electrochromic devices of Examples 1 and 2.

Figure 3A:
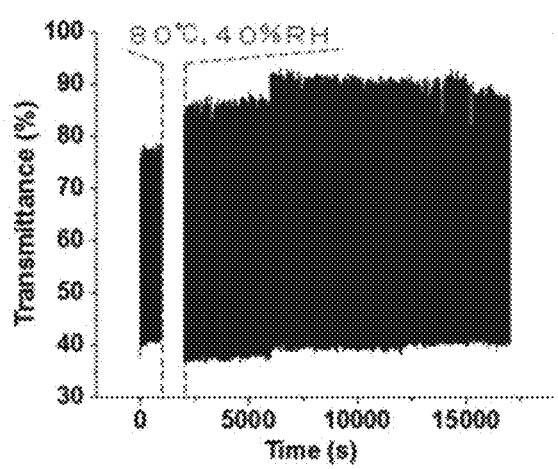
FIG. 3 is a view illustrating a change over time in transmittance at a wavelength of 580 nm when oxidation-reduction was repeated under various conditions of the electrochromic devices of Examples 1 and 2.
Figure 3B:
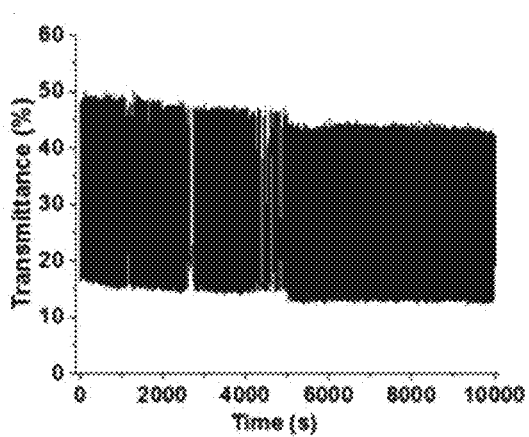
Figure 3C:
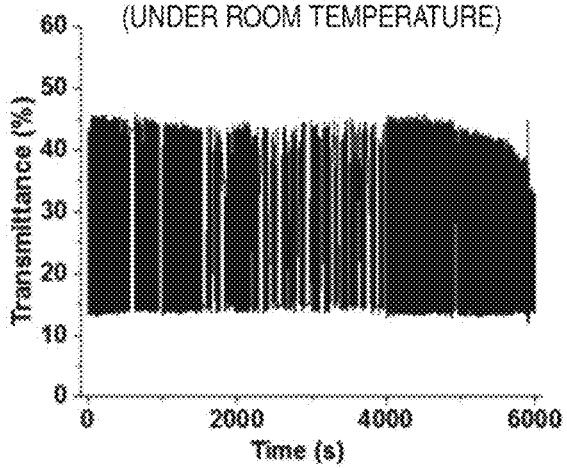

FIG. 3(A) is a view illustrating a change in transmittance at a wavelength of 580 nm when the oxidation-reduction was repeated by applying a voltage of ±3.0 V every 5 seconds to the electrochromic device of Example 1 under the conditions indicated in an upper column for Example 1 of Table 2. FIG. 3(B) is a view illustrating a change in transmittance at a wavelength of 580 nm when the oxidation-reduction was repeated by applying a voltage of ±3.0 V every 5 seconds to the electrochromic device of Example 1 under the conditions indicated in a lower column for Example 1 of Table 2. FIG. 3(C) is a view illustrating a change in transmittance at a wavelength of 580 nm when the oxidation-reduction was repeated by applying a voltage of ±3.0 V every 5 seconds to the electrochromic device of Example 2 under the conditions indicated in Example 2 of Table 2.

In any of the electrochromic devices illustrated in FIG. 3, when the applied voltage was switched from +3.0 V to −3.0 V, the absorbance at a wavelength of 580 nm reached a predetermined value (that is, a colored state), and when the applied voltage was switched from −3.0 V to +3.0 V, the absorbance at a wavelength of 580 nm was decreased (that is, a decolored state). When −3.0 V (or 0 V) of voltage was applied, it became in a reduction state, and the Fe ion of polyFe became divalent and was colored purple. When +3.0 V was applied, it became in an oxidation state, and the Fe ion became trivalent. It was found from these results that the electrochromic devices of Example 1/Example 2 developed electrochromism.

According to FIG. 3(B) and FIG. 3(C), even if the oxidation-reduction of the electrochromic device using polyFe of each of Examples 1 and 2 was repeated 100 times (approximately 1,000 s) at room temperature, the transmittance value in the reduction state was substantially unchanged, and was excellent in durability. However, in the electrochromic device of Example 2 in which the counter electrode material layer was not provided, a decrease in contrast was gradually observed after about 500 times (approximately 5,000 s) of the oxidation-reduction; whereas, in the electrochromic device of Example 1 in which the counter electrode material layer was provided, high contrast was kept even when the oxidation-reduction reached 1,000 times (approximately 10,000 s).

Even more surprisingly, according to FIG. 3(A), in the electrochromic device of Example 1, the contrast ratio after the electrochromic device was held in a chamber set at a temperature of 80° C. and a relative humidity of 40%, and the oxidation-reduction was repeated 100 times was improved compared to that before heating, and exhibited stable properties for 1,700 repetitions of oxidation-reduction. This reveals that the provision of the counter electrode material layer improves the durability of the electrochromic device of the present invention, and performs a stable electrochromic action even at high temperatures.

Although a blank portion in FIG. 3(A) corresponds to 100 repetitions of oxidation-reduction under heating, data for the change in transmittance is not shown due to the condition of the device. However, it should be noted that the presence or absence of deterioration of the electrochromic device obtained from the change in transmittance before and after heating can be observed.

FIG. 4 is a view illustrating a change in transmittance at a wavelength of 500 nm when the oxidation-reduction was repeated under various conditions of the electrochromic devices of Examples 3 and 4.

Figure 4A:
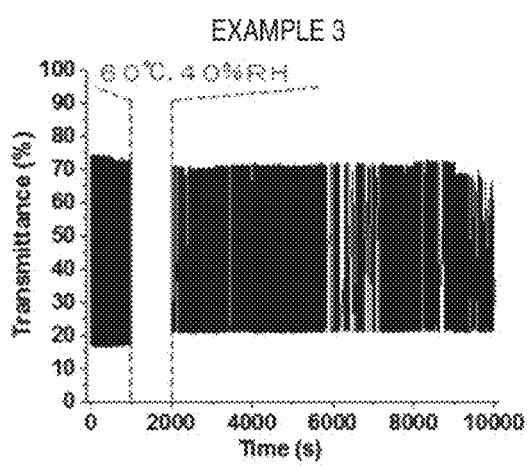
FIG. 4 is a view illustrating a change over time in transmittance at a wavelength of 500 nm when oxidation-reduction was repeated under various conditions of the electrochromic devices of Examples 3 and 4.
Figure 4B:
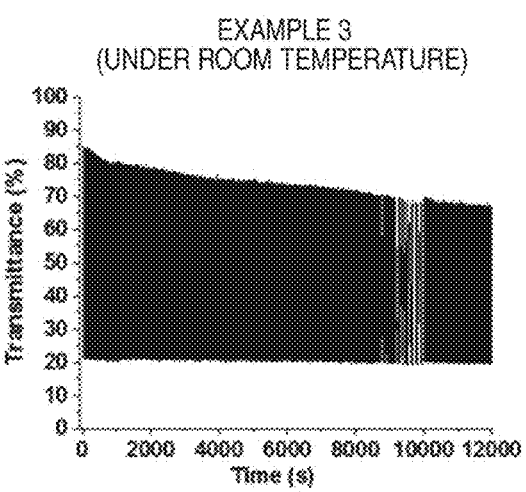
Figure 4C:
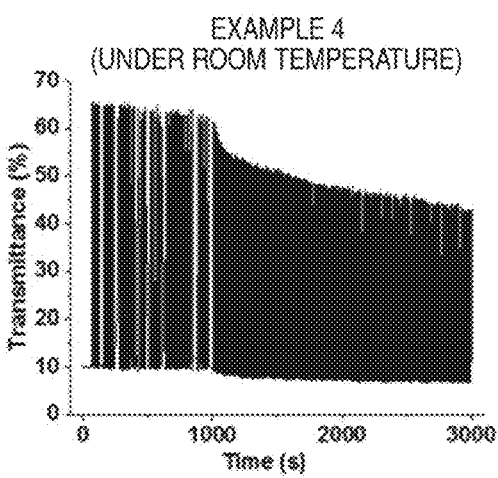

FIG. 4(A) is a view illustrating a change over time in transmittance at a wavelength of 500 nm when the oxidation-reduction was repeated by applying a voltage of ±3.0 V every 5 seconds to the electrochromic device of Example 3 under the conditions indicated in an upper column for Example 3 of Table 2. FIG. 4(B) is a view illustrating a change over time in transmittance at a wavelength of 500 nm when the oxidation-reduction was repeated by applying a voltage of ±3.0 V every 5 seconds to the electrochromic device of Example 3 under the conditions indicated in a lower column for Example 3 of Table 2. FIG. 4(C) is a view illustrating a change over time in transmittance at a wavelength of 500 nm when the oxidation-reduction was repeated by applying a voltage of ±3.0 V every 5 seconds to the electrochromic device of Example 4 under the conditions indicated in a lower column for Example 4 of Table 2.

In any of the electrochromic devices illustrated in FIG. 4, when the applied voltage was switched from +3.0 V to −3.0 V, the absorbance at a wavelength of 500 nm reached a predetermined value (that is, a colored state), and when the applied voltage was switched from −3.0 V to +3.0 V, the absorbance at a wavelength of 500 nm was decreased (that is, a decolored state). When −3.0 V (or 0 V) of voltage was applied, it became in a reduction state, and the Ru ion of polyRu became divalent and was colored red. When +3.0 V was applied, it became in an oxidation state, and the Ru ion became trivalent. It was found from these results that the electrochromic devices of Examples 3 and 4 developed electrochromism.

According to FIG. 4(B) and FIG. 4(C), even if the oxidation-reduction of the electrochromic device using polyRu of each of Examples 3 and 4 is repeated 100 times at room temperature, the transmittance value in the reduction state was substantially unchanged, and was excellent in durability. However, in the electrochromic device of Example 4 in which the counter electrode material layer was not provided, a drastic decrease in contrast was observed after about 100 times of the oxidation-reduction; whereas, in the electrochromic device of Example 3 in which the counter electrode material layer was provided, constant contrast was kept even when the oxidation-reduction reached 1,200 times (approximately 12,000 s) and a decrease in the contrast ratio was observed, but decreasing tendency was gradual.

Even more surprisingly, according to FIG. 4(A), in the electrochromic device of Example 3, the contrast ratio after the electrochromic device was held in a chamber set at a temperature of 60° C. and a relative humidity of 40%, and the oxidation-reduction was repeated 100 times was slightly lower than that before heating, but exhibited stable properties for 900 repetitions of oxidation-reduction at room temperature thereafter. This reveals that the provision of the counter electrode material layer improves the durability of the electrochromic device of the present invention, and performs a stable electrochromic action even at high temperatures.

Table 3 shows the electrochromic properties of the electrochromic devices of Examples 1 to 4.

TABLE 3

Table 3: List of electrochromic properties of structures produced in Examples 1 and 3/Examples 2 and 4

| Example No. | Temperature in chamber (° C.) | Decoloring time $t_b$ (s) | Coloring time $t_d$ (s) | $\Delta T_i$ (%) | $\Delta T_{300}/\Delta T_i$ (%) | $\Delta T_{1000}/\Delta T_i$ (%) |
|---|---|---|---|---|---|---|
| Example 1 | 80 | 2.24 | 1.88 | 37.4 | 125 | 134 |
|  | — | 3.08 | 1.78 | 32.6 | >99 | 86.6 |
| Example 2 | — | 2.72 | 0.86 | 30.8 | 96.7 | — |
| Example 3 | 60 | 1.92 | 0.73 | 56.0 | 86.5 | 80.7 |
|  | — | 1.12 | 1.28 | 62.6 | 97.7 | 76.5 |
| Example 4 | — | 1.86 | 0.96 | 54.3 | 65.3 | — |

In Table 3, $\Delta T_1$ (%) is a value of transmittance at a wavelength of 580 nm (Examples 1 and 2) and 500 nm (Examples 3 and 4) in the first oxidation-reduction cycle, and represents contrast. $\Delta T_{300}/\Delta T_i$ (%) is the ratio of the 300th value to the transmission value at the first contrast, and represents the durability. Similarly, $\Delta T_{1000}/\Delta T_i$ (%) is the ratio of the 1,000th value to the transmission value at the first contrast and represents the durability.

As shown in Table 3, the response properties (decoloring time and coloring time) and the contrast ratio of the electrochromic devices of Examples 1 and 3 were comparable to those of Examples 2 and 4 without using the counter electrode layer. This reveals that the counter electrode material layer does not act to reduce the electrochromic properties. What is especially noteworthy is that the electrochromic device of Example 1 exhibited more excellent electrochromic properties at high temperatures (under heating at 80° C.) as compared to room temperature. Similarly, the electrochromic device of Example 3 did not exhibit significant deterioration of the properties even at high temperatures.

From these results, according to the present invention, by providing the counter electrode material layer containing a conductive polymer, it was possible to obtain an electrochromic device which achieved a stable electrochromic action even at elevated temperatures of 60° C. to 80° C., and was excellent in the heat resistance and the durability.

FIG. 5 is a view illustrating appearance of surfaces of the first and second electrodes of the electrochromic device of Example 2 after the evaluation for the properties.

FIG. 5(A) is a view illustrating the surface appearance of the first electrode of the electrochromic device of Example 2 after the evaluation for the properties. A polyFe film is bonded to the first electrode surface as an electrochromic layer. FIG. 5(B) is a view illustrating the surface appearance of the second electrode of the electrochromic device of Example 2 after the evaluation for the properties. The second electrode surface is in a state where the electrolyte layer was wiped off.

FIG. 5(A) illustrates a bluish purple color of the polyFe film (corresponding to a black area in FIG. 5(A)). In addition, when the polyFe film was wiped off, the first electrode surface was colorless and transparent, and no deterioration was observed. On the other hand, according to FIG. 5(B), even though the second electrode surface was not in direct contact with the polyFe film, the color of the second electrode surface was changed to brown (corresponding to a black area in FIG. 5(B)), and deterioration was observed. Although not shown, the electrochromic device of Example 1 after the evaluation for the properties at room temperature was similarly disassembled, and the surfaces of the first electrode and the second electrode were observed. As a result, it was found that all were colorless and transparent and did not show any deterioration.

From this, it was found that by providing the counter electrode material layer on the second electrode, the deterioration of the second electrode could be suppressed, which contributed to the maintenance of the electrochromic properties. This means that in the electrochromic device of Example 1 provided with the counter electrode material layer, the property deterioration was not observed even after 1,000 repetitions of oxidation-reduction; whereas in the electrochromic device of Example 2 without the counter electrode material layer, the decrease in the contrast ratio was observed after 500 repetitions of oxidation-reduction (FIGS. 3(B) and 3(C)).

TABLE 4

Table 4: List of measurement conditions of X-ray photoelectron spectroscopy measurement in Example 2

| | Analysis conditions |
|---|---|
| X-ray (Al Kα mono: Monochromatic light) | 1486.6 eV |
| Output | 100 W (20 kV, 5 mA) |
| Measurement region | 1.4 × 0.1 mm |
| Detection angle | 45 degrees |
| Wide scan | Pass energy 280 eV, energy step 0.5 eV |
| Narrow scan | Pass energy 55 eV, energy step 0.1 eV |
| Electro static charge neutralization | Electron flood 1.4 eV, 20 mA |
| Energy calibration | Performed by adjusting C1s peak top to 285.0 eV |
| Calculation of element abundance ratio | Calculated by using wide scan spectrum |

According to the measurement conditions shown in Table 4, X-ray photoelectron spectroscopy (XPS) analysis was performed on each electrode surface. The results will be described in detail.

Figure 6:
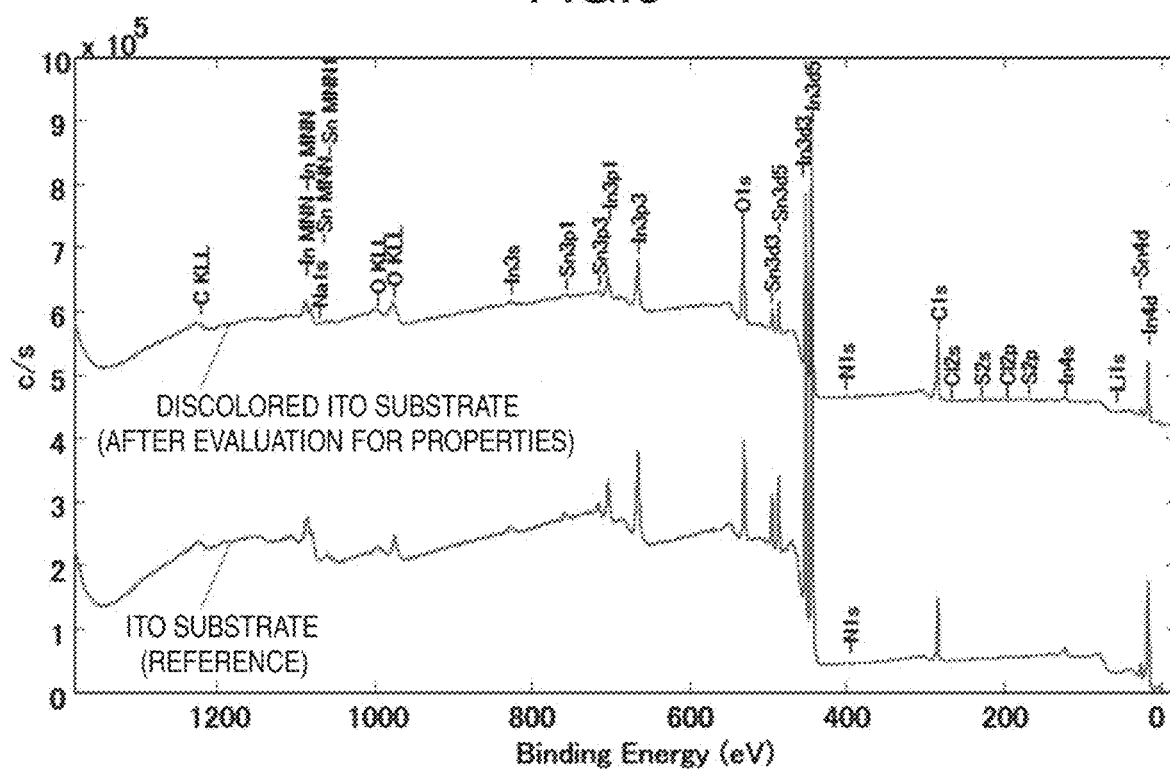
FIG. 6 is a view illustrating an XPS wide scan spectrum of the second electrode surface of the electrochromic device of Example 2.

FIG. 6 is a view illustrating an XPS wide scan spectrum of the second electrode surface of the electrochromic device of Example 2.

Figure 7:
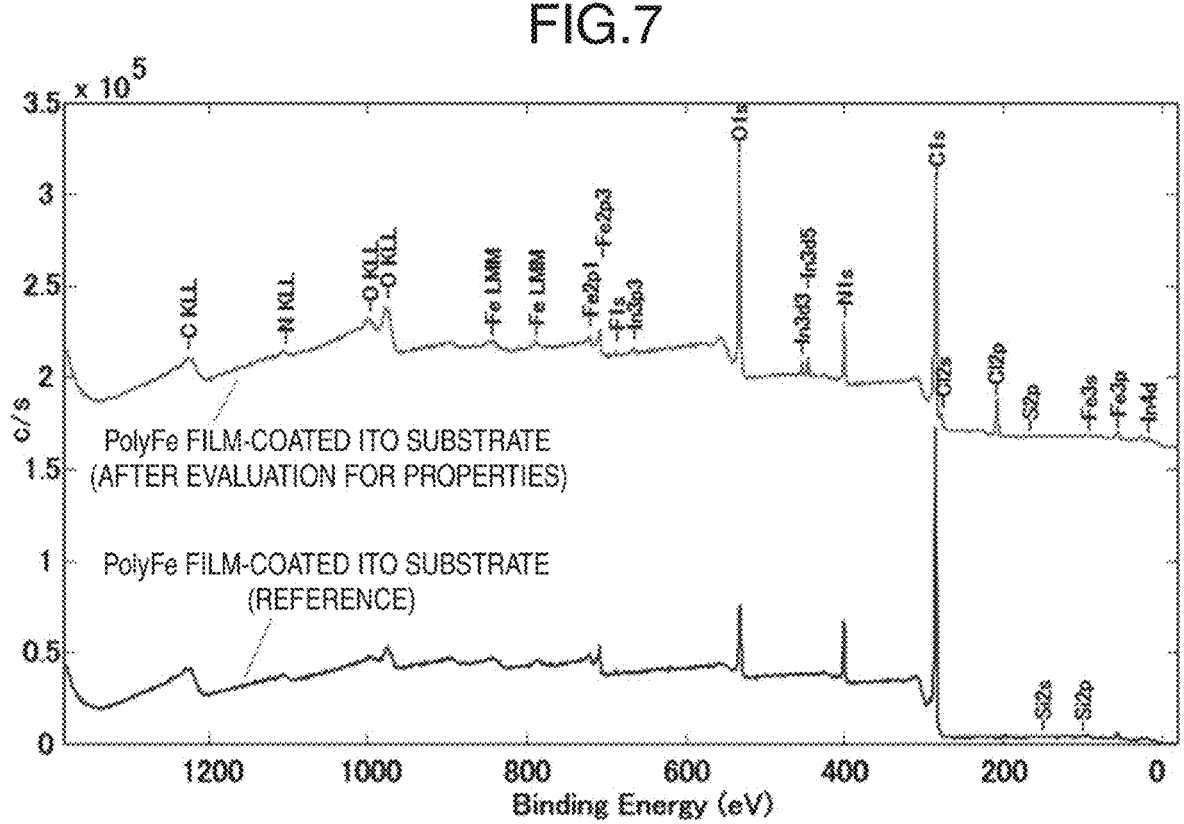
FIG. 7 is a view illustrating an XPS wide scan spectrum of the first electrode surface (with a polyFe film) of the electrochromic device of Example 2.

FIG. 7 is a view illustrating an XPS wide scan spectrum of the first electrode surface (with a polyFe film) of the electrochromic device of Example 2.

FIG. 6 also illustrates an XPS spectrum of an ITO substrate used for producing the electrochromic device for reference. FIG. 7 also illustrates an XPS spectrum of an ITO substrate provided with a polyFe film which has not been subjected to the evaluation for the properties for reference. The discolored ITO substrate in FIG. 6 is the brown discolored second electrode surface obtained by decomposing the electrochromic device of Example 2 after the evaluation for the properties.

In FIG. 6, when the XPS spectrum of the discolored ITO substrate was compared with that of the ITO substrate for reference, a peak shift was observed. In FIG. 7, the XPS spectrum of the ITO substrate with polyFe film after the evaluation for the properties had peaks of In3d5 and In3d3, but not any peak of Sn. In addition, when the XPS spectrum of the discolored ITO substrate was compared with that of the ITO substrate with polyFe film after the evaluation for the properties, the XPS spectrum of the discolored ITO substrate did not have any peak of Fe. Further, it was more specifically examined by narrow scan.

FIG. 8 is a view illustrating a C1s narrow scan spectrum (A) and an O1s narrow scan spectrum (B) of each electrode surface.

FIG. 9 is a view illustrating an N1s narrow scan spectrum (A) and an Fe2p narrow scan spectrum (B) of each electrode surface.

FIG. 10 is a view illustrating an In3d narrow scan spectrum (A) and an Sn3d narrow scan spectrum (B) of each electrode surface.

Figure 11B:
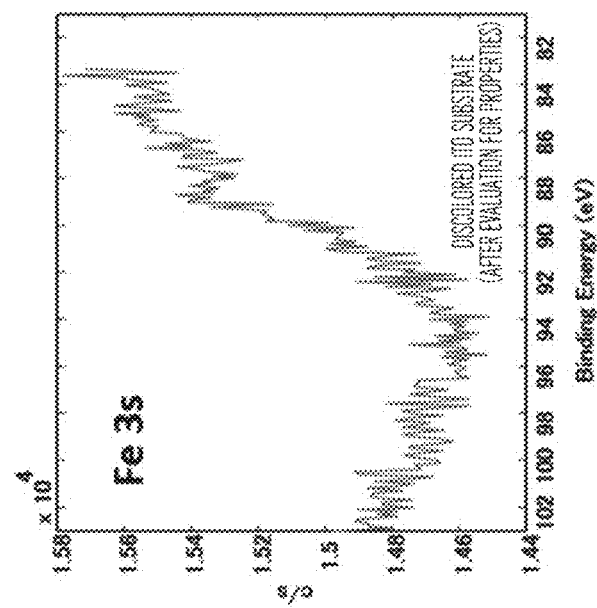
FIG. 11 is a view illustrating an Li1s narrow scan spectrum (A) and an Fe3s narrow scan spectrum (B) of each electrode surface.

FIG. 11 is a view illustrating an Li1s narrow scan spectrum (A) and an Fe3s narrow scan spectrum (B) of each electrode surface.

Further, Tables 5 and 6 each show abundance ratios of elements obtained from the wide scan spectrum.

TABLE 5

Table 5: Abundance ratio of element on ITO substrate surface evaluated in Example 2

| Sample | Li 1s | C 1s | N 1s | O 1s | Na 1s | S 2p | Cl 2p | In 3d5 | Sn 3d5 (Atomic %) |
|---|---|---|---|---|---|---|---|---|---|
| ITO substrate (reference) | | 41.7% | 0.6% | 34.6% | | | | 21.1% | 2.0% |
| Discolored ITO substrate (after evaluation for properties) | 0.3% | 51.0% | 0.6% | 36.8% | 0.1% | 0.1% | 0.1% | 10.0% | 1.0% |

TABLE 6

Table 6: Abundance ratio of element on polyFe film-coated ITO substrate surface evaluated in Example 2

| Sample | C 1s | N 1s | O 1s | F 1s | Si 2p | S 2p | Cl 2p | Fe 2p | In 3d5 (Atomic %) |
|---|---|---|---|---|---|---|---|---|---|
| PolyFe film-coated ITO substrate (reference) | 80.0% | 8.5% | 9.1% | 0.2% | 0.1% | | 0.1% | 1.4% | |
| PolyFe film-coated ITO substrate (after evaluation for properties) | 64.7% | 7.8% | 23.1% | 0.2% | | 0.1% | 2.8% | 1.1% | 0.2% |

Figure 10A:
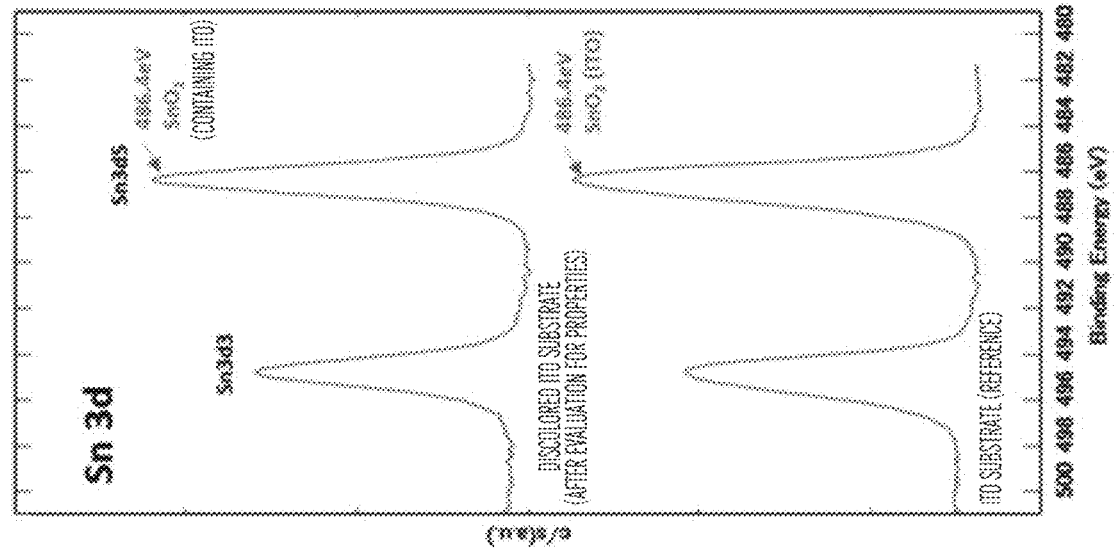
FIG. 10 is a view illustrating an In3d narrow scan spectrum (A) and an Sn3d narrow scan spectrum (B) of each electrode surface.
Figure 10B:
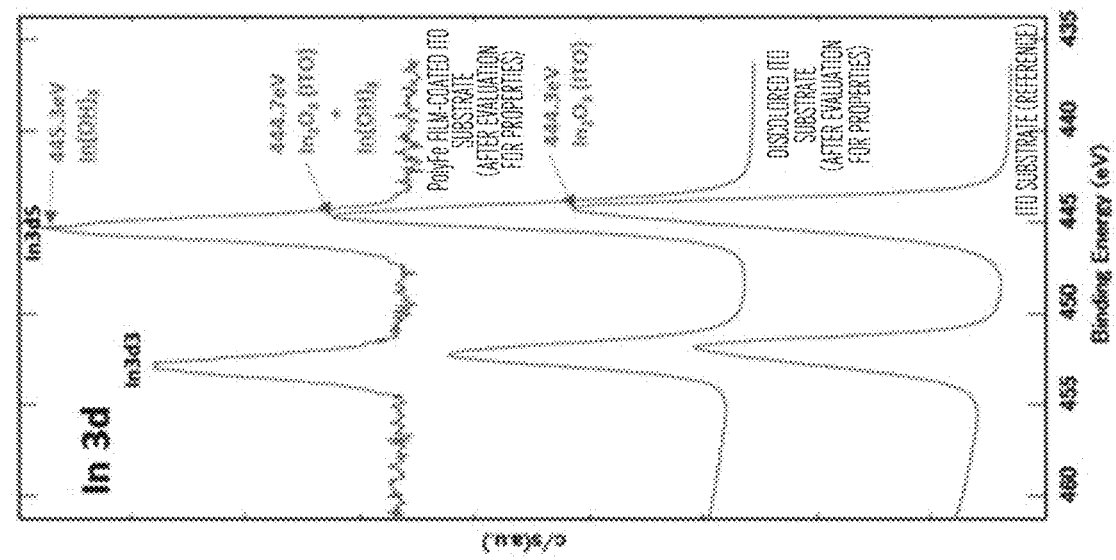

According to FIG. 10(A), the binding energy of the In3d5 peak in the spectrum of the discolored ITO substrate was 444.7 eV, which was positioned on a higher energy side than the binding energy (444.3 eV) of the ITO substrate for reference. This suggests that indium hydroxide $In(OH)_3$ was present in addition to indium oxide $In_2O_3$ of ITO in the discolored ITO substrate.

Figure 8A:
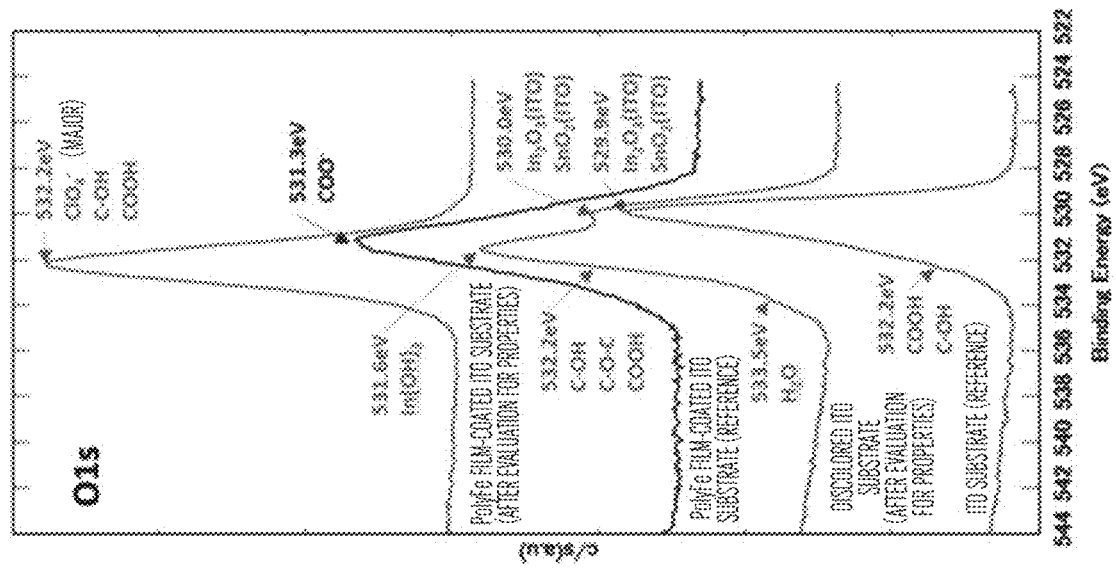
FIG. 8 is a view illustrating a C1s narrow scan spectrum (A) and an O1s narrow scan spectrum (B) of each electrode surface.
Figure 8B:
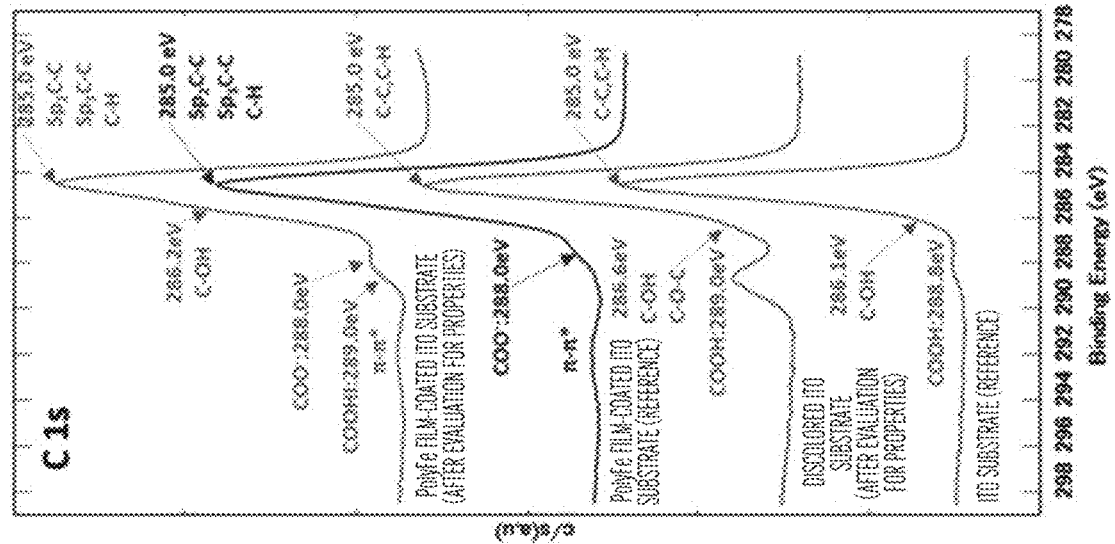

Moreover, according to FIG. 8(B), the spectrum of the discolored ITO substrate had a peak of 531.6 eV which corresponds to $In(OH)_3$, which suggests the presence of indium hydroxide on the surface. On the other hand, according to FIG. 10(B), the XPS spectra of all the substrates had no shift in the binding energy of the Sn3d5 peak, which was the same value of 486.4 eV ($SnO_2$).

According to FIG. 8(B), the XPS spectrum of the discolored ITO substrate had a shoulder peak at 533.5 eV. This suggests the presence of water on the surface of the discolored ITO substrate.

Figure 11A:
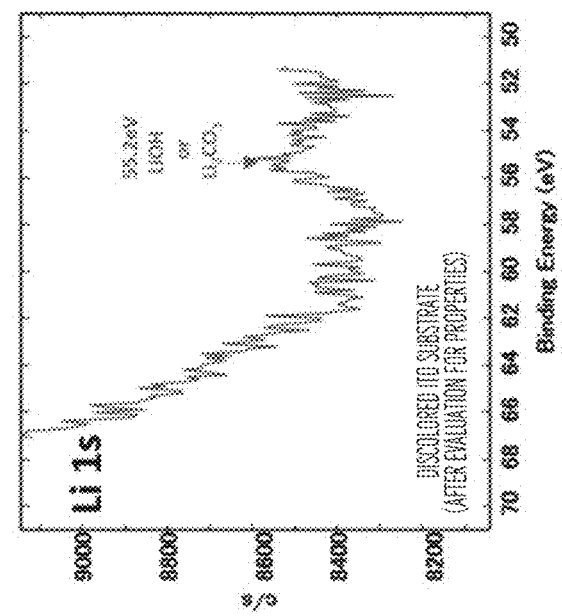

According to Table 5, a trace amount (0.3 at %) of lithium was detected from the surface of the discolored ITO substrate. As illustrated in FIG. 11(A), the spectrum of the surface of the discolored ITO substrate had a binding energy (55.2 eV) of the Li1s peak, and a trace amount of lithium was attributed to lithium hydroxide.

From the above results, the deterioration of ITO due to water contamination into the electrochromic device can be considered as a cause of discoloration of the ITO substrate surface on the counter electrode side after the evaluation for the properties, and eluted indium ions were presumed to form a hydroxide as a deposit. Further, it is presumed that Li ions in the electrolyte layer were deposited on the surface of the ITO substrate to form lithium hydroxide.

As described above, according to the wide scan spectrum of FIG. 6(A), iron (Fe) was not detected from the surface of the discolored ITO substrate. Further, the Fe peak was not observed from the narrow scan spectrum of the discolored ITO substrate of FIG. 9(B), either.

According to Table 6, a trace amount (0.2 at %) of indium was detected from the surface of the polyFe film-coated ITO substrate after the evaluation for the properties. Further, from FIG. 10(A) the XPS spectrum of the ITO substrate with the polyFe film after the evaluation for the properties indicates the binding energy (445.3 eV) of the In3d5 peak. From these results, the indium detected from the surface of the polyFe film-coated ITO substrate after the evaluation for the properties was attributed to indium hydroxide. According to Table 6 and FIG. 10(B), tin was not detected from the surface of the polyFe film-coated ITO substrate after the evaluation for the properties.

Figure 9B:
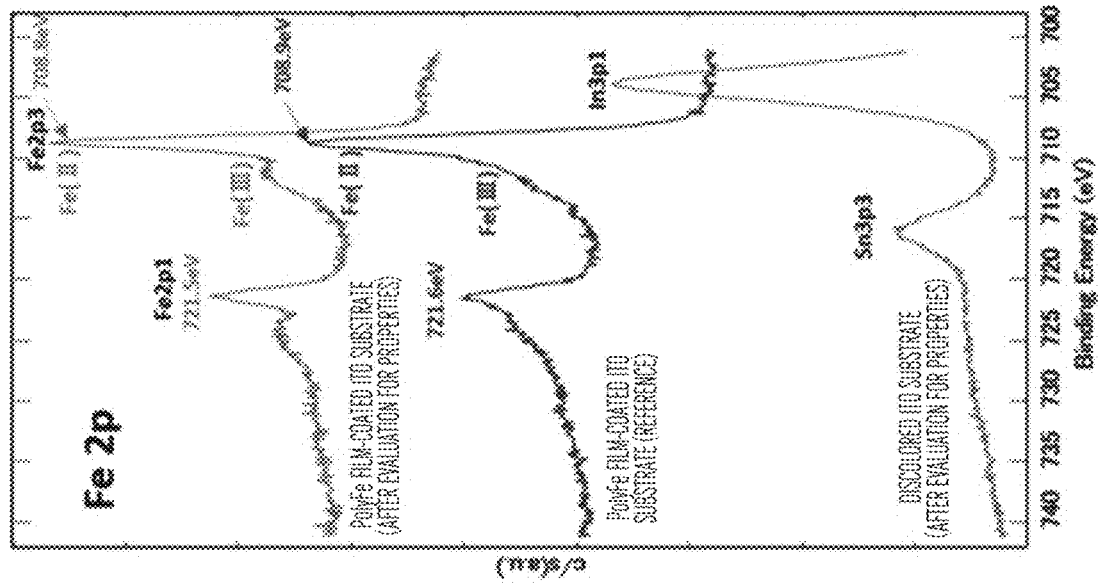
FIG. 9 is a view illustrating an N1s narrow scan spectrum (A) and an Fe2p narrow scan spectrum (B) of each electrode surface.
Figure 9A:
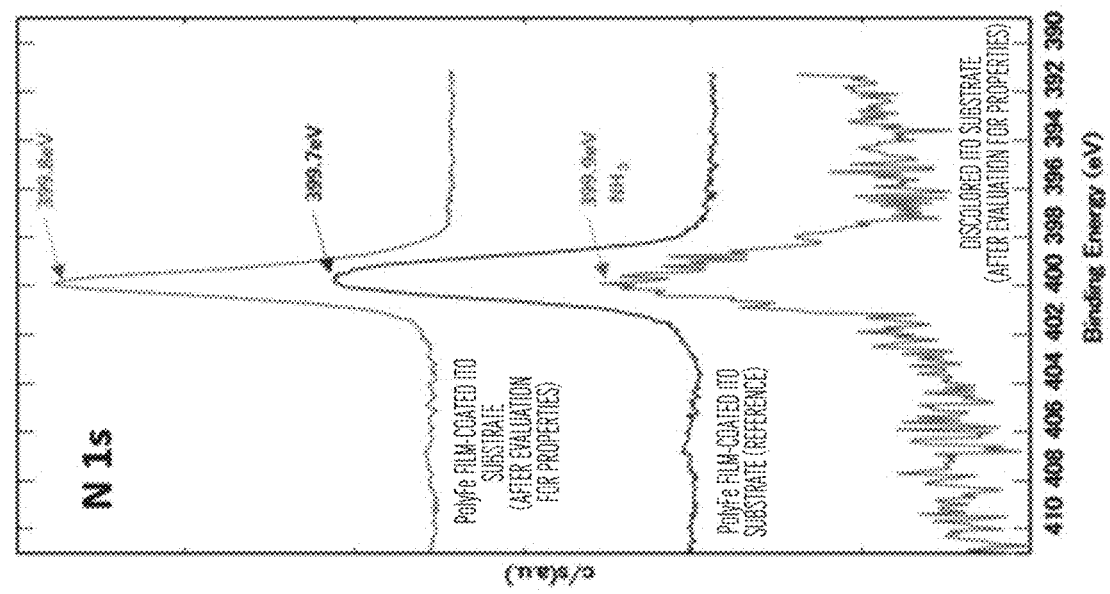

According to FIG. 8(A), when the C1s peak of the polyFe film-coated ITO substrate after the evaluation for the properties was compared with the C1s peak of the polyFe film-coated ITO substrate for reference, in any of the cases, a $Sp_2$C—C bond and a related π-π* peak were observed. Further, according to FIG. 9(A), the binding energy of the N1s peak of the polyFe film-coated ITO substrate after the evaluation for the properties and the binding energy of the polyFe film-coated ITO substrate for reference indicated substantially the same value. In addition, although there is a difference in the ratios between Fe (II) and Fe (III) as shown in FIG. 9(B), the binding energy of the Fe2p3 peak of the polyFe film-coated ITO substrate after the evaluation for the properties and the binding energy of the Fe2p3 peak of the polyFe film-coated ITO substrate for reference indicated substantially the same value.

From the above results, it can be concluded that the deterioration of the electrochromic layer by the evaluation for the properties was scarce.

From these results, it was found that the PolyFe film was hardly deteriorated, and the cause of the deterioration of ITO on the counter electrode side was that due to the contamination of water into the electrochromic device, the eluted indium ions produced indium hydroxide, and the Li ions in the electrolyte layer produced lithium hydroxide. Therefore, the introduction of the counter electrode material layer containing a conductive polymer of the present invention is very advantageous way to effectively suppress the formation of the above-described hydroxide, and achieve the excellent durability, especially at high temperatures.

INDUSTRIAL APPLICABILITY

The electrochromic device provided with the counter electrode material layer containing a conductive polymer according to the present invention is excellent in all of electrochromic properties, heat resistance, and durability. Therefore, the electrochromic device can be used in any device utilizing coloring and decoloring, and in particular, it can be applied to a display element, a light control element, and an electronic paper.

What is claimed is:

1. An electrochromic device comprising:
a first electrode;
an electrochromic layer which is disposed on the first electrode and contains an organic/metal hybrid polymer containing at least an organic ligand and a metal ion coordinated to the organic ligand;
an electrolyte layer disposed on the electrochromic layer;
a counter electrode material layer which is disposed on the electrolyte layer and contains a conductive polymer; and
a second electrode disposed on the counter electrode material layer;
wherein the conductive polymer comprises at least one polymer selected from the group consisting of polypyrroles, polyanilines, polythiophenes, poly(p-phenylene)s, poly(3,4-ethylenedioxythiophene)-poly(styrene sulfonate)s (PEDOT:PSS), polyfluorenes, poly(p-phenylenevinylene)s, and polythienylenevinylenes;
wherein the organic/metal hybrid polymer comprises at least one polymer represented by a general formula selected from the group consisting of Formulae (I), (II), and (III):

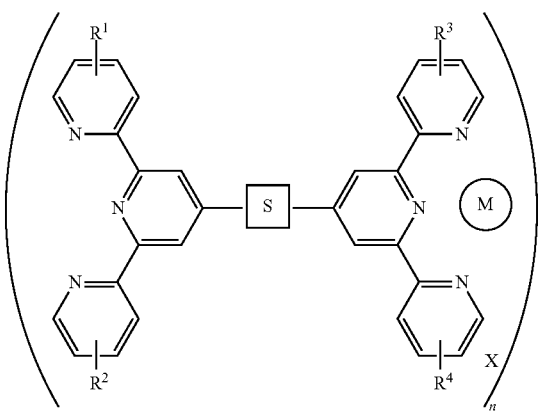

(I)

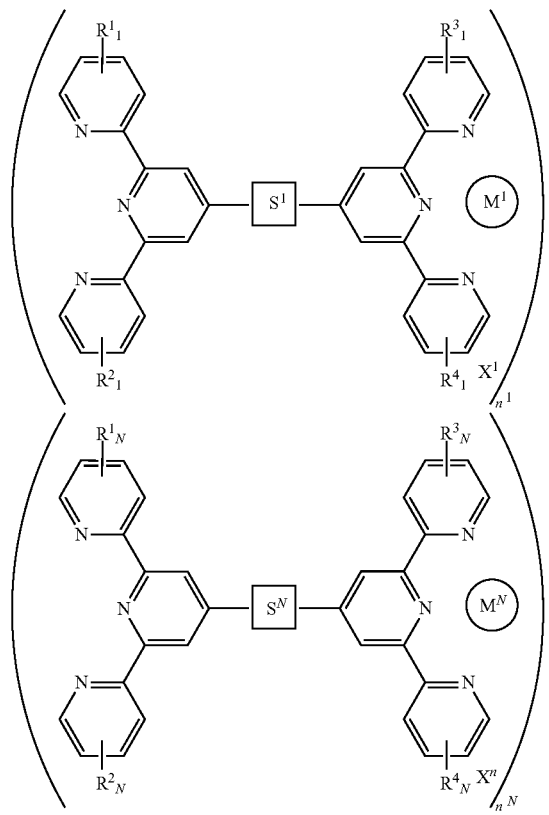

(II)

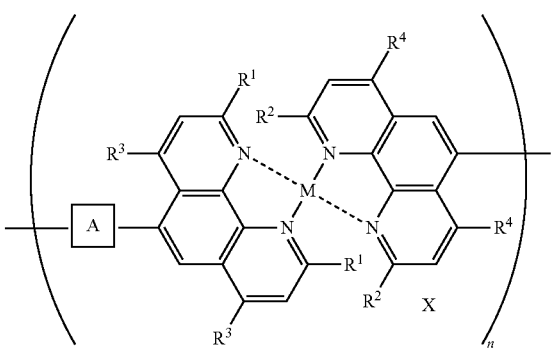

(III)

wherein in the Formula (I), M represents a metal ion, X represents a counter anion, S represents a spacer containing a carbon atom and a hydrogen atom or a spacer directly connecting two terpyridine groups, $R^1$ to $R^4$ each independently represent a hydrogen atom or a substituent, and n is an integer of 2 or greater indicating a degree of polymerization;

wherein in the Formula (II), $M^1$ to $M^N$ each independently represent a metal ion having an oxidation-reduction potential different from other metal ions of $M^1$ to $M^N$, N is an integer of 2 or greater, $X^1$ to $X^n$ each independently represent a counter anion, n is an integer of 2 or greater, $S^1$ to $S^N$ each independently represent a spacer containing a carbon atom and a hydrogen atom or a spacer directly connecting two terpyridine groups, $R^1_1$ to $R^1_N$, $R^2_1$ to $R^2_N$, $R^3_1$ to $R^3_N$, and $R^4_1$ to $R^4_N$ each independently represent a hydrogen atom or a substituent, and $n^1$ to $n^N$ each independently indicate the degree of polymerization;

wherein in the Formula (III), M represents a metal ion, X represents a counter anion, A represents a spacer containing a carbon atom and a hydrogen atom or a spacer directly connecting two phenanthroline groups, $R^1$ to $R^4$ each independently represent a hydrogen atom or a substituent, and n is an integer of 2 or greater indicating the degree of polymerization;

wherein the counter electrode material layer containing the conductive polymer has a thickness in a range of 10 nm to 50 nm; and wherein a ratio of a layer thickness of the counter electrode material layer to a layer thickness of the second electrode satisfies a range of 0.20 to 0.42.

2. The electrochromic device according to claim 1, wherein the organic ligand comprises at least one ligand selected from the group consisting of a terpyridine group, a phenanthroline group, a bipyridine group, an imino group, and derivatives thereof.

3. The electrochromic device according to claim 1, wherein the metal ion comprises at least one metal ion selected from the group consisting of metal ions of Pt, Cu, Ni, Pd, Ag, Mo, Fe, Co, Ru, Rh, Eu, Zn, and Mn.

4. The electrochromic device according to claim 1, wherein the electrolyte layer contains at least a polymer and a support salt.

5. The electrochromic device according to claim 4, wherein the polymer comprises at least one polymer selected from the group consisting of polymethyl methacrylate (PMMA), polyethylene oxide (PEO), poly(vinylidene fluoride-co-hexafluoroisopropyl) (PVdF-co-PHFP), polypropylene carbonate (PPC), polycarbonate, and polyacrylonitrile.

6. The electrochromic device according to claim 4, wherein the support salt comprises at least one salt selected from the group consisting of $LiClO_4$, $LiBF_4$, $LiAsF_6$, $LiPF_6$, $LiCF_3SO_3$, $LiCF_3COO$, lithium bis(trifluoromethanesulfonyl) imide (LiTFSI), $LiCH_3COO$, tetrabutylammonium perchlorate, tetraethylammonium perchlorate, KCl, $NaClO_3$, NaCl, $NaBF_4$, NaSCN, $KBF_4$, $Mg(ClO_4)_2$, and $Mg(BF_4)_2$.

7. The electrochromic device according to claim 4, wherein the electrolyte layer further contains at least one plasticizer selected from the group consisting of propylene carbonate (PC), ethylene carbonate), dimethyl carbonate, diethyl carbonate, γ-butyrolactone, succinonitrile, and an ionic liquid.

8. The electrochromic device according to claim 1, wherein the electrochromic layer further contains an ionic liquid, and
wherein the ionic liquid forms an ionic bond with the organic/metallic hybrid polymer.

9. The electrochromic device according to claim 8, wherein the ionic liquid is a combination of at least one anion selected from the group consisting of tetrafluoroborate, hexafluorophosphate, bis(trifluoromethanesulfonyl) imide, and bis(pentafluoroethylsulfonyl) imide, with at least one cation selected from the group consisting of imidazolium, pyrrolidinium, and tetraalkylammonium.

10. The electrochromic device according to claim 1, which is sealed by a sealing agent containing an epoxy resin and/or a silicone resin.

11. A method of producing the electrochromic device according to claim 1, the method comprising:
a step of forming an electrochromic layer by applying a material containing an organic/metallic hybrid polymer containing at least an organic ligand and a metal ion coordinated to the organic ligand onto a first electrode;
a step of treating a surface of the electrochromic layer with an electrolyte material;
a step of forming an electrolyte layer by applying a further electrolyte material on the electrochromic layer;
a step of forming a counter electrode material layer by applying a conductive polymer onto a second electrode;
a step of forming a structure including the first electrode, the electrochromic layer, the electrolyte layer, the counter electrode material layer, and the second electrode by applying the second electrode having the counter electrode material layer onto the electrolyte layer; and
a step of heat-treating the structure.

12. The method according to claim 11, wherein the step of treating with the electrolyte material further includes applying the electrolyte material to the surface of the electrochromic layer; and peeling the electrolyte material.

13. The method according to claim 12, wherein the applying of the electrolyte material to the surface of the electrochromic layer and the peeling of the electrolyte material are repeated.

14. The method according to claim 11, wherein the electrolyte material contains a dehydrated solvent.

15. The method according to claim 14, wherein the dehydrated solvent comprises at least one solvent selected from the group consisting of acetonitrile, acetone, and tetrahydrofuran.

16. The electrochromic device according to claim 1, wherein the counter electrode material layer has a conductivity of 100 S/cm or more.

17. The electrochromic device according to claim 1, wherein the counter electrode material layer has a transmittance of 80% or more in a visible light region at 400 nm to 780 nm.

* * * * *